(12) United States Patent
Kim et al.

(10) Patent No.: US 11,838,519 B2
(45) Date of Patent: Dec. 5, 2023

(54) IMAGE ENCODING/DECODING METHOD AND APPARATUS FOR SIGNALING IMAGE FEATURE INFORMATION, AND METHOD FOR TRANSMITTING BITSTREAM

(71) Applicant: LG ELECTRONICS INC., Seoul (KR)

(72) Inventors: Chul Keun Kim, Seoul (KR); Eunyong Son, Seoul (KR); Yongjoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/799,154

(22) PCT Filed: Feb. 26, 2021

(86) PCT No.: PCT/KR2021/002509
§ 371 (c)(1),
(2) Date: Aug. 11, 2022

(87) PCT Pub. No.: WO2021/172956
PCT Pub. Date: Sep. 2, 2021

(65) Prior Publication Data
US 2023/0085554 A1    Mar. 16, 2023

(30) Foreign Application Priority Data

Feb. 28, 2020  (KR) .................. 10-2020-0025476
Mar. 6, 2020   (KR) .................. 10-2020-0028127
Mar. 25, 2020  (KR) .................. 10-2020-0035995

(51) Int. Cl.
*H04N 19/167*   (2014.01)
*H04N 19/17*    (2014.01)
(Continued)

(52) U.S. Cl.
CPC .......... *H04N 19/167* (2014.11); *H04N 19/17* (2014.11); *H04N 19/188* (2014.11); *H04N 19/60* (2014.11)

(58) Field of Classification Search
CPC ............ G06N 20/00; G06N 3/04; G06N 3/08; H04N 19/124; H04N 19/167; H04N 19/17;
(Continued)

(56) References Cited

U.S. PATENT DOCUMENTS 10,419,773 B1    9/2019  Wei et al.
2006/0059510 A1*  3/2006  Huang ................. H04N 19/87
                                          375/E7.199
(Continued)

FOREIGN PATENT DOCUMENTS

KR         101982436 B    5/2019
KR       1020200005402 A  1/2020

OTHER PUBLICATIONS

"Use cases and draft requirements for Video Coding for Machines" Requirements Subgroup, ISO/IEC 2020, (Jan. 17, 2020).

*Primary Examiner* — Mohammed S Rahaman
(74) *Attorney, Agent, or Firm* — Bryan Cave Leighton Paisner LLP

(57) ABSTRACT

An image encoding/decoding method and apparatus are provided. An image decoding method comprises obtaining, from a bitstream, encoded data of feature information generated by applying an artificial neural network-based feature extraction method to an image, reconstructing feature information by decoding the encoded data of the feature information, and generating analysis data of the image based on the feature information.

13 Claims, 43 Drawing Sheets

(51) Int. Cl.
*H04N 19/169* (2014.01)
*H04N 19/60* (2014.01)

(58) Field of Classification Search
CPC ...... H04N 19/188; H04N 19/20; H04N 19/60; H04N 19/70
See application file for complete search history.

(56) References Cited

U.S. PATENT DOCUMENTS

| | | | |
|---|---|---|---|
| 2012/0201306 A1* | 8/2012 | Kang | H04N 21/4345 375/E7.243 |
| 2018/0332301 A1* | 11/2018 | Tian | G06F 18/213 |
| 2019/0171929 A1 | 6/2019 | Abadi et al. | |
| 2021/0073530 A1* | 3/2021 | Schaefer | G06V 30/422 |
| 2021/0150767 A1* | 5/2021 | Ikai | G06T 9/002 |
| 2021/0203997 A1* | 7/2021 | Veselov | G06V 10/454 |
| 2022/0417540 A1* | 12/2022 | Adzic | H04N 19/20 |

* cited by examiner

FIG. 4
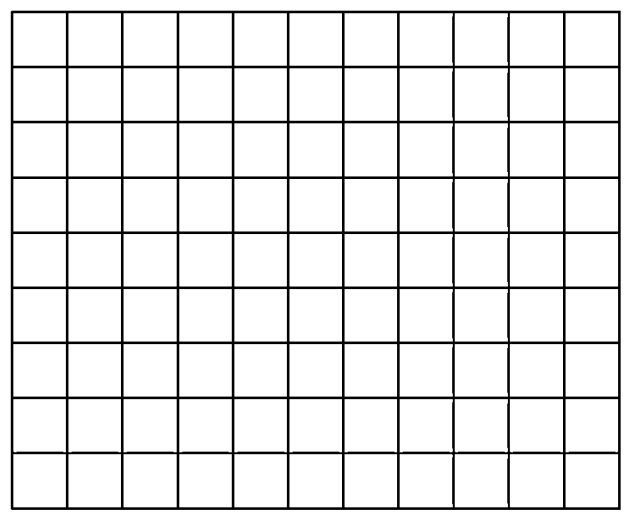
FIG. 5
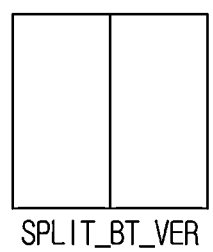  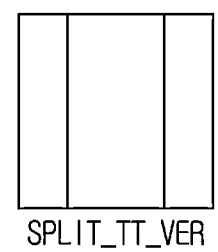 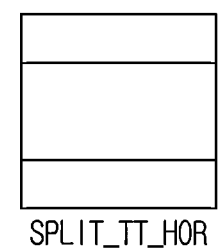
SPLIT_BT_VER  SPLIT_BT_HOR  SPLIT_TT_VER  SPLIT_TT_HOR FIG. 32
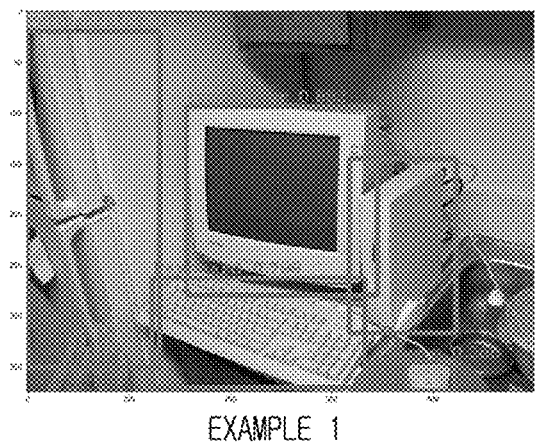
EXAMPLE 1
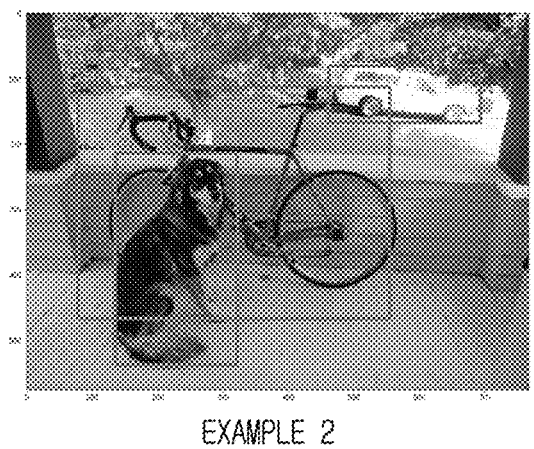
EXAMPLE 2

FIG. 34
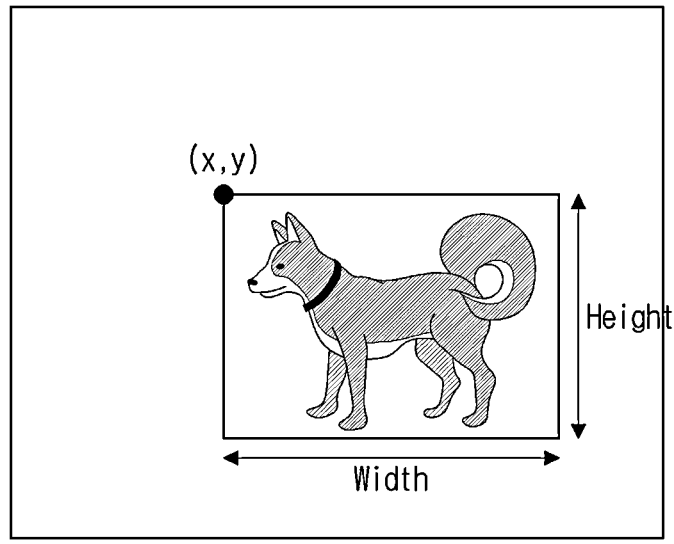
FIG. 35
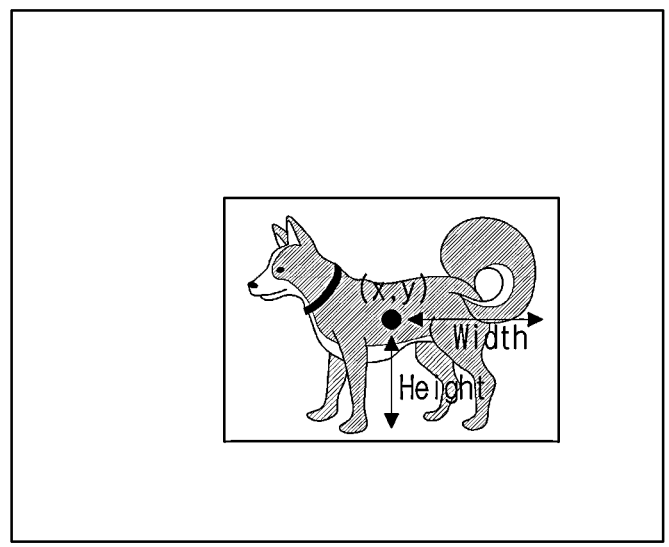
FIG. 36
| seq_parameter_set_rbsp() { |
|---|
|   num_tasks |
|   for( i = 0; i <= num_tasks; i++ ) { |
|     task_id[ i ] |
|   } |
|   ... |
| } |

FIG. 37

```
feature_set_header( ) {
  ...
  for( i=0; i<=num_tasks; i++) {
    if(task_id [ i ] == 0) { //object detection
      num_regions
      for( i = 0; i <= num_regions; i++ ) {
        region_pos_x[ i ]
        region_pos_y[ i ]
        region_width[ i ]
        region_height[ i ]
      }
    }
  }
  ...
}
```

FIG. 42

| TRANSFORM PROCESS | INVERSE TRANSFORM PROCESS |
|---|---|
| CFHeight = FeatHeight[L]<br>CFWidth = FeatWidth[L]<br>CFDepth = FeatNum[L]<br><br>for ( i=0; i<CFDepth; i++)<br>  for ( row=0; row<CFHeight; row++)<br>    for ( col=0; col<CFWidth; col++)<br>      CF[i][row][col] = Feat$_L$[i][row][col] | FeatHeight*[L] = CFHeight<br>FeatWidth*[L] = CFWidth<br>FeatNum*[L] = CFDepth<br><br>for ( i=0; i<CFDepth; i++)<br>  for ( row=0; row<CFHeight; row++)<br>    for ( col=0; col<CFWidth; col++)<br>      Feat$_L$*[i][row][col] = CF[i][row][col] |

HOW TO TREAT INDIVIDUAL FEATURE CHANNELS OF FEAT$_L$ (L-TH LAYER ACTIVATION) AS INDEPENDENT CODING UNITS

FIG. 43

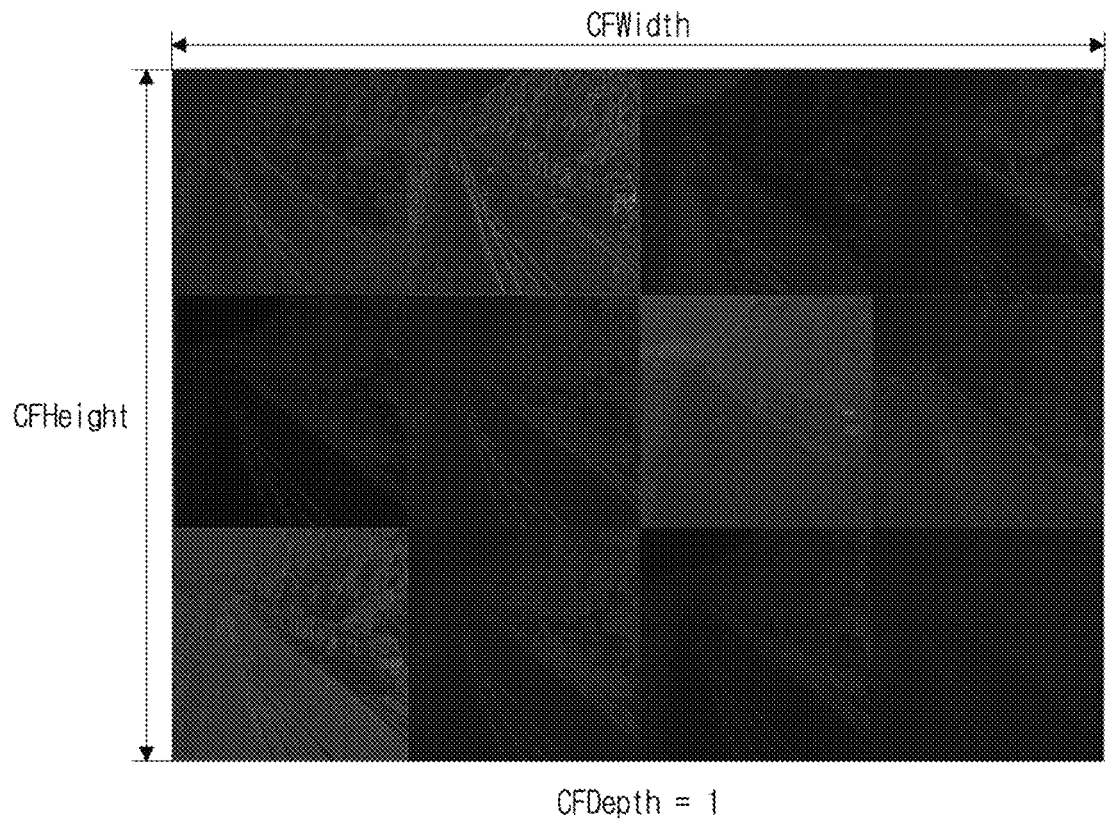

CFDepth = 1

HOW TO CONCATENATE ALL FEATURES OF FEAT$_L$ (L-TH LAYER ACTIVATION) WITHOUT FORM TRANSFORM

TRANSFORM PROCESS

```
CFWidth = FeatWidth[L] * Num_c
CFHeight = FeatHeight[L] * Num_r  (s.t. Num_r = Ceil(FeatNum[L]/Num_c))
CFDepth = 1
DiffNum = (Num_c * Num_r) - FeatNum[L]

for ( i=0; i<Num_r; i++)
  for ( j=0; j<Num_c; j++)
    for ( row=0; row<CFHeight; row++)
      for ( col=0; col<CFWidth; col++)
        if ( i*Num_r + j >= FeatNum[L] )
          CF[j*Num_r+row][j*Num_c+col] = 0
        else
          CF[j*Num_r+row][j*Num_c+col] = Feat_L[i*Num_r+j][row][col]
```

INVERSE TRANSFORM PROCESS

```
FeatHeight*[L] = CFHeight / Num_r
FeatWidth*[L] = CFWidth / Num_c
FeatNum*[L] = ( Num_r * Num_c ) - DiffNum for ( i=0; i<Num_r; i++)
  for ( j=0; j<Num_c; j++)
    if ( i*Num_r + j >= FeatNum*[L] )
      break
    for ( row=0; row<CFHeight; row++)
      for ( col=0; col<CFWidth; col++)
        Feat_L*[i*Num_r+j][row][col] = CF[j*Num_r+row][j*Num_c+col]
```

FIG. 47

| HOW TO GROUP SOME FEATURES OF $FEAT_L$ (L-TH LAYER ACTIVATION) TO INCREASE DEPTH |
|---|
| TRANSFORM PROCESS |
| CFWidth = FeatWidth[L] * $Num_c$<br>CFHeight = FeatHeight[L] * $Num_r$ (s.t. $Num_r <= Ceil(FeatNum[L]/Num_c)$)<br>CFDepth = Ceil ( FeatNum[L]/($Num_r$*$Num_c$) )<br>CFMod = FeatNum[L]%($Num_r$*$Num_c$)<br><br>for ( g=0; g<CFDepth; g++)<br>  for ( i=0; i<$Num_r$; i++)<br>    for ( j=0; j<$Num_c$; j++)<br>      for ( row=0; row<CFHeight; row++)<br>        for ( col=0; col<CFWidth; col++)<br>          if ( g==(CFDepth-1) && CFMod!=0 && ((i*$Num_r$+j)>(CFMod-1)) )<br>            CG[g][i*$Num_r$+row][j*$Num_c$+col] = 0<br>          else<br>            CG[g][i*$Num_r$+row][j*$Num_c$+col] = $Feat_L$[g*($Num_c$*$Num_r$)+i*$Num_r$+j][row][col] |
| INVERSE TRANSFORM PROCESS |
| FeatHeight*[L] = CFHeight / $Num_r$<br>FeatWidth*[L] = CFWidth / $Num_c$<br>FeatNum*[L] = (CFMod)? (( $Num_r$ * $Num_c$ ) * (CFDepth-1) + CFMod) : (( $Num_r$ * $Num_c$ ) * CFDepth)<br><br>for ( g=0; g<CFDepth; g++)<br>  for ( i=0; i<$Num_r$; i++)<br>    for ( j=0; j<$Num_c$; j++)<br>      for ( row=0; row<CFHeight; row++)<br>        for ( col=0; col<CFWidth; col++)<br>          if (g*($Num_c$*$Num_r$)+i*$Num_r$+j >= FeatNum*[L] )<br>            break<br>          else<br>            $Feat_L$*[g*($Num_c$*$Num_r$)+i*$Num_r$+j][row][col] = CG[g][i*$Num_r$+row][j*$Num_c$+col] |

Coding Format Examples

IMAGE ENCODING/DECODING METHOD AND APPARATUS FOR SIGNALING IMAGE FEATURE INFORMATION, AND METHOD FOR TRANSMITTING BITSTREAM

CROSS-REFERENCE TO RELATED APPLICATIONS

This application is a National Stage filing under 35 U.S.C. 371 of International Application No. PCT/KR2021/002509, with an international filing date of Feb. 26, 2021, which claims the benefit of KR Patent Application No. 10-2020-0025476, filed on Feb. 28, 2020, KR Patent Application No. 10-2020-0028127, filed Mar. 6, 2020, and KR Patent Application No. 10-2020-0035995, filed Mar. 25, 2020, all of which are incorporated by reference in their entirety herein.

TECHNICAL FIELD

The present disclosure relates to an image encoding/decoding method and apparatus and, more particularly, to an image encoding/decoding method and apparatus for signaling feature information of an image and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for improving encoding/decoding efficiency by improving a feature information signaling method of an image.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining, from a bitstream, encoded data of feature information generated by applying an artificial neural network-based feature extraction method to an image, reconstructing feature information by decoding the encoded data of the feature information, and generating analysis data of the image based on the feature information. Here, the feature information may be reconstructed based on any one of abstraction information of the feature information, a region of interest of the feature information and an encoding format for the feature information.

An image decoding apparatus according to an aspect of the present disclosure may comprise a memory and at least one processor, The at least one processor may obtain, from a bitstream, encoded data of feature information generated by applying an artificial neural network-based feature extraction method to an image, reconstruct feature information by decoding the encoded data of the feature information, and generate analysis data of the image based on the feature information. Here, the feature information may be reconstructed based on any one of abstraction information of the feature information, a region of interest of the feature information and an encoding format for the feature information.

An image encoding method performed by an image encoding apparatus according to an aspect of the present disclosure may comprise obtaining feature information from an input image using an artificial neural network-based feature extraction method and generating encoding information of the feature information based on the feature information. Here, the encoding information may be generated based on any one of abstraction information of the feature information, a region of interest of the feature information and an encoding format for the feature information.

A transmission method according to another aspect of the present disclosure may transmit a bitstream generated by the image encoding apparatus or the image encoding method of the present disclosure.

A computer-readable recording medium according to another aspect of the present disclosure may store a bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus for improving encoding/decoding efficiency by using an improved signaling method of image feature information.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view illustrating a partitioning structure of an image according to an embodiment.

FIG. 5 is a view illustrating an embodiment of a partitioning type of a block according to a multi-type tree structure.

FIG. 32 is a diagram illustrating an example of an object identified from an image.

FIGS. 34 and 35 are diagrams illustrating two examples of expressing region information.

FIGS. 36 to 37 are diagrams illustrating an embodiment of syntax for signaling task information to perform a method proposed in the present disclosure.

FIG. 42 is a diagram illustrating a process of transform into a CF and inverse transform into a feature according to an embodiment.

FIG. 43 is a diagram illustrating an embodiment of a CF according to an embodiment.

FIG. 44 is a diagram illustrating an algorithm for transforming a feature into a CF or inversely transforming a CF to a feature according to an embodiment.

FIG. 47 is a diagram illustrating an algorithm for performing transform from a feature into a CF and inverse transform from a CF into a feature according to an embodiment

MODE FOR INVENTION

Figure 1:
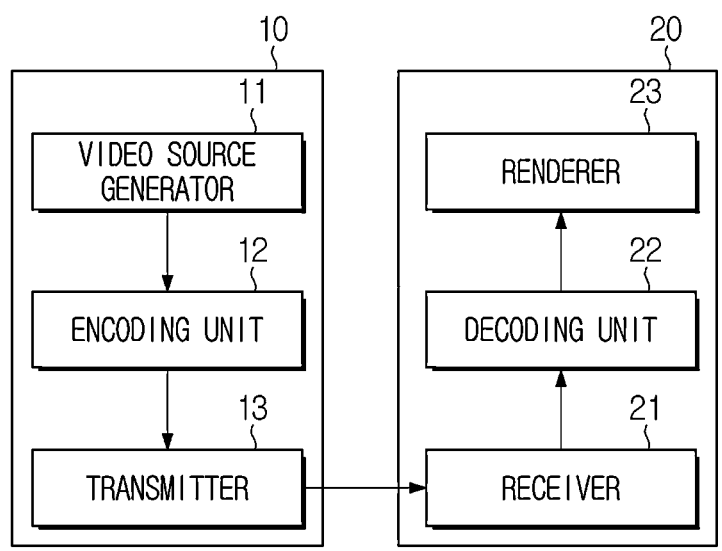
FIG. 1 is a view schematically illustrating a video coding system to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to lar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G, and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment, In particular, especially when applied to VCM, the unit may represent a basic unit containing information for performing a specific task.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view illustrating a video coding system according to the present disclosure.

The video coding system according to an embodiment may include a source device 10 and a reception device 20. The source device 10 may transmit encoded video and/or image information or data to the reception device 20 in the form of a file or streaming via a digital storage medium or network.

The source device 10 according to an embodiment may include a video source generator 11, an encoder 12 and a transmitter 13. The reception device 20 according to an embodiment may include a receiver 21, a decoder 22 and a renderer 23. The encoder 12 may be called a video/image encoding device, and the decoding device 22 may be called a video/image decoding device. The transmitter 13 may be included in the encoder 12. The receiver 21 may be included in the decoder 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data. In an embodiment, video/image synthesis and generation may be performed during an information processing process (AI input information, information in image processing, output information) by AI. In this case, information generated in the video/image capture process may be utilized as input information of AI.

The encoder 12 may encode an input video/image. The encoder 12 may perform a series of procedures such as prediction, transform, and quantization for compression and coding efficiency. The encoder 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoder 22.

The decoder 22 may decode the video/image by performing a series of procedures such as dequantization, inverse transform, and prediction corresponding to the operation of the encoder 12.

The renderer 23 may render the decoded video/image. The rendered video/image may be displayed through the display.

The decoded video may be used not only for rendering but also as input information for use in other systems. For example, the decoded video may be utilized as input information for performing AI tasks. For example, the decoded video may be utilized as input information for performing AI tasks such as face recognition, behavior recognition, and lane recognition.

Overview of Image Encoding Apparatus

Figure 2:
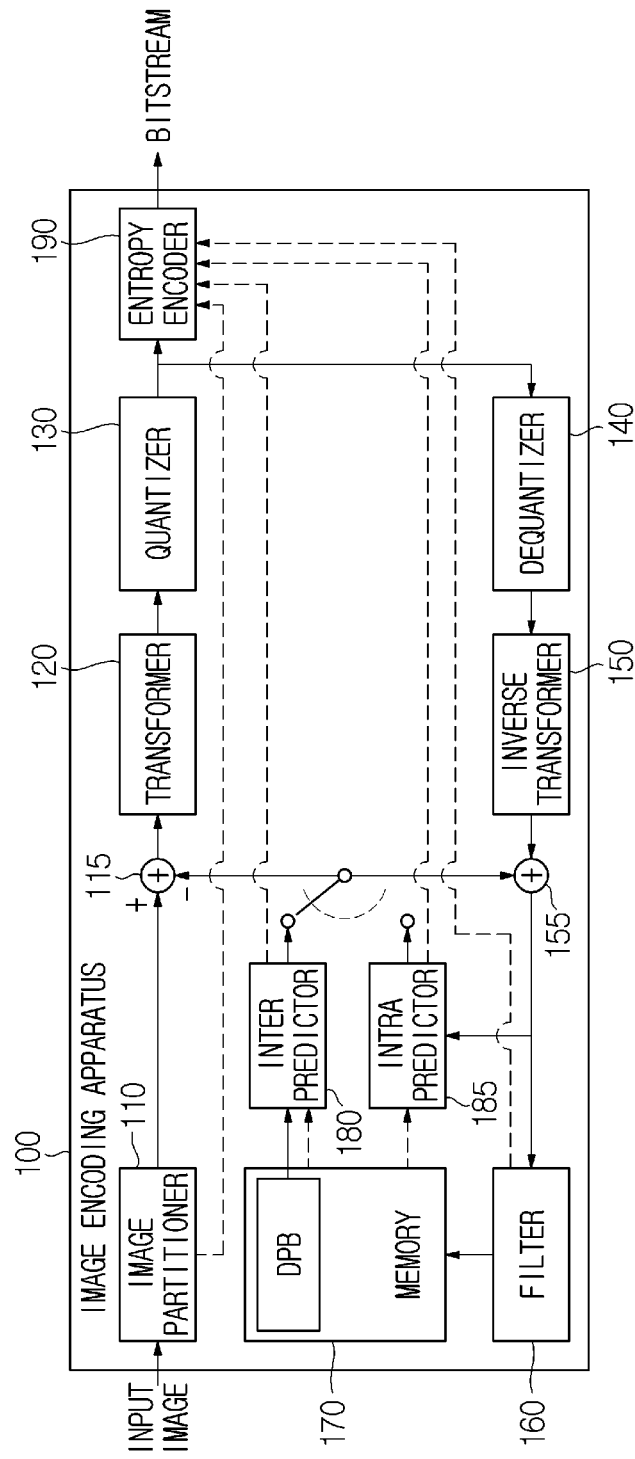
FIG. 2 is a view schematically illustrating an image encoding apparatus to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. Here, the input image may be a normal image obtained by an image sensor and/or an image generated by AI. For example, the processing unit may be called a coding unit (CU). The coding unit may be acquired by recursively partitioning a coding tree unit (CTU) or a largest coding unit (LCU)

according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. In IBC, prediction is basically performed in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may include a method of generating and using encoded information, a purpose, and the like. For example, especially when applied to VCM, the video/image information may include information indicating which AI task the encoded information is encoded for, and which network (e.g. neural network) is used to encode the encoded information, and/or information indicating for what purpose the encoded information is encoded.

Information and/or syntax elements transmitted/signaled from the encoding apparatus of the present disclosure to the decoding apparatus may be included in video/image information. The signaled information, transmitted information and/or syntax elements described in the present disclosure may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). In case there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
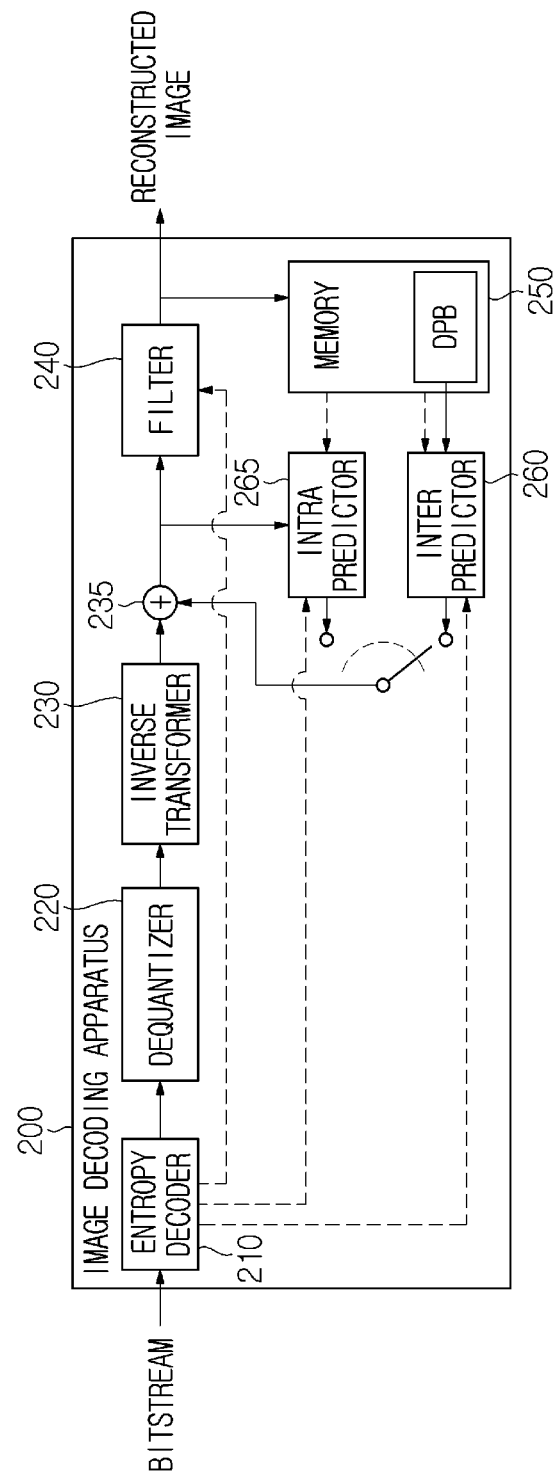
FIG. 3 is a view schematically illustrating an image decoding apparatus to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. For example, especially when applied to VCM, the video/image information may include information indicating which AI task the encoded information is encoded for, and which network (e.g. neural network) is used to encode the encoded information, and/or information indicating for what purpose the encoded information is encoded. In an embodiment, even if the corresponding image is an image having general characteristics having a general task, network, and/or use, a value thereof shall be described.

The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235. In case there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de) quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. A maximum allowable size of a CTU for coding and prediction may be different from a maximum allowable size of a CTU for transform. For example, a maximum allowable size of a luma block in the CTU may be 128×128, even if the maximum size of luma transform blocks is 64×64.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view illustrating an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
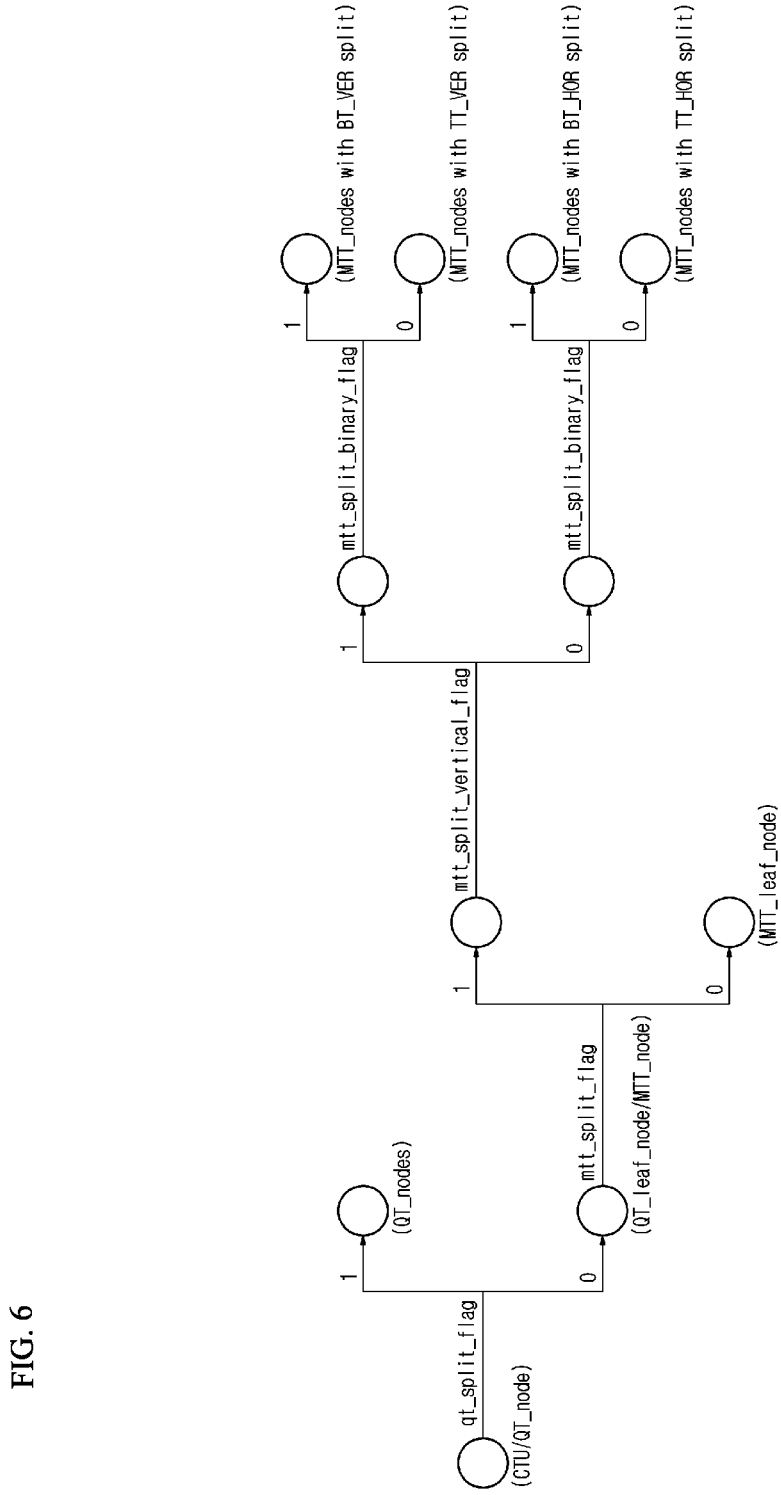
FIG. 6 is a view illustrating a signaling mechanism of block splitting information in a quadtree with nested multi-type tree structure according to the present disclosure.

FIG. 6 is a view illustrating a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
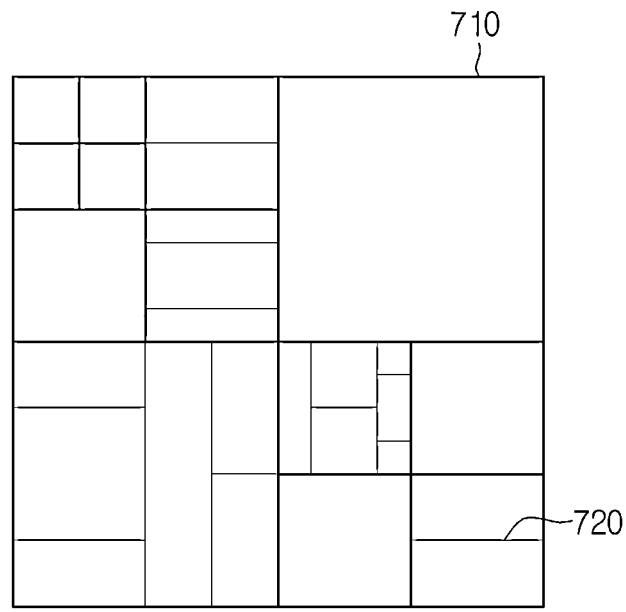
FIG. 7 is a view illustrating an example in which a CTU is partitioned into multiple CUs.

FIG. 7 is a view illustrating an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

In addition, in encoding and decoding of a video/image according to the present disclosure, an image processing unit may have a hierarchical structure. One picture may be divided into one or more tiles, bricks, slices and/or tile groups. One slice may include one or more bricks. One brick may include one or more CTU rows in a tile. A slice may include an integer number of bricks of a picture. One tile group may include one or more tiles. One tile may include one or more CTUs. A CTU may be divided into one or more CUs. A tile may be a rectangular region including a specific tile row and a specific tile column composed of a plurality of CTUs in a picture. A tile group may include an integer number of tiles according to tile raster scan in a picture. A slice header may carry information/parameters applicable to a corresponding slice (blocks in a slice). When an encoding apparatus or a decoding apparatus has a multi-core processor, an encoding/decoding procedure for the tile, the slice, the brick and/or the tile group may be performed in parallel.

In the present disclosure, the names or concepts of the slice or the tile group may be used interchangeably. That is, a tile group header may be referred to as a slice header. Here, a slice may have one of slice types including an intra (I) slice, a predictive (P) slice and a bi-predictive (B) slice. For blocks in an I slice, inter prediction is not used for prediction and only intra prediction may be used. Of course, even in this case, an original sample value may be coded and signaled without prediction. For blocks in a P slice, intra prediction or inter prediction may be used. When inter prediction is used, only uni-prediction may be used. Meanwhile, for blocks in a B slice, intra prediction or inter prediction may be used. When inter prediction is used, up to bi-prediction may be used.

The encoding apparatus may determine tile/tile group, brick, slice and maximum and minimum coding unit size according to the characteristics (e.g., resolution) of a video image or in consideration of coding efficiency and parallel processing. In addition, information on this or information capable of deriving this may be included in a bitstream.

The decoding apparatus may acquire information indicating whether a tile/tile group, a brick or a slice of a current picture or a CTU in a tile is partitioned into a plurality of coding units. The encoding apparatus and the decoding apparatus may increase encoding efficiency, by signaling such information under specific conditions.

The slice header (slice header syntax) may include information/parameters that may be commonly applied to the slice. The APS (APS syntax) or PPS (PPS syntax) may include information/parameters that may be commonly applied to one or more pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters associated with combination of coded video sequence (CVS).

In addition, for example, information on partitioning and configuration of the tile/tile group/brick/slice may be constructed at an encoding stage through the high level syntax and transmitted to the decoding apparatus in the form of a bitstream.

Partitioning of Picture Using Subpicture, Slice and Tile

One picture may be partitioned into at least one tile row and at least one tile column. One tile may be composed of a sequence of CTUs and may cover a rectangular region of one picture.

The slice may be composed of an integer number of complete tiles or an integer number of consecutive complete CTU rows in one picture.

For the slice, two modes may be supported: one may be called a raster-scan slice mode and the other may be called a rectangular slice mode. In the raster-scan slice mode, one slice may include a complete tile sequence present in one picture in the tile raster scan order. In the rectangular slice mode, one slice may include a plurality of complete tiles assembled to form a rectangular region of a picture or a plurality of consecutive complete CTU rows of one tile assembled to form a rectangular region of a picture. Tiles in the rectangular slice may be scanned in the tile raster scan order in the rectangular region corresponding to the slice. The subpicture may include at least one slice assembled to cover a rectangular region of a picture.

Figure 8:
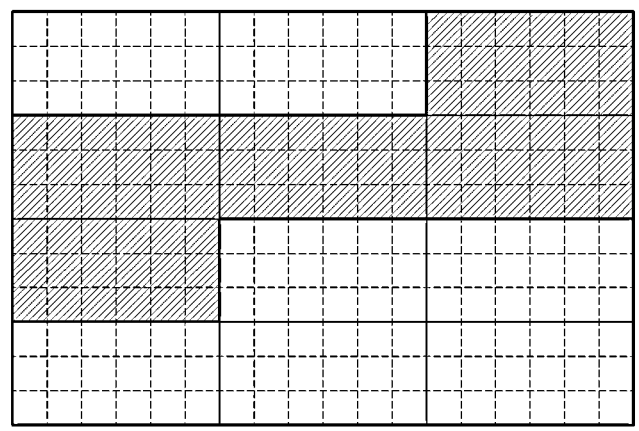
FIGS. 8 to 11 illustrate embodiments of partitioning a picture using a tile, a slice and a subpicture.
Figure 9:
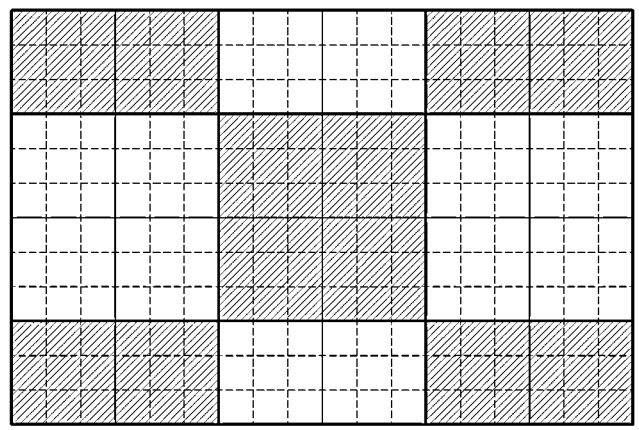
Figure 10:
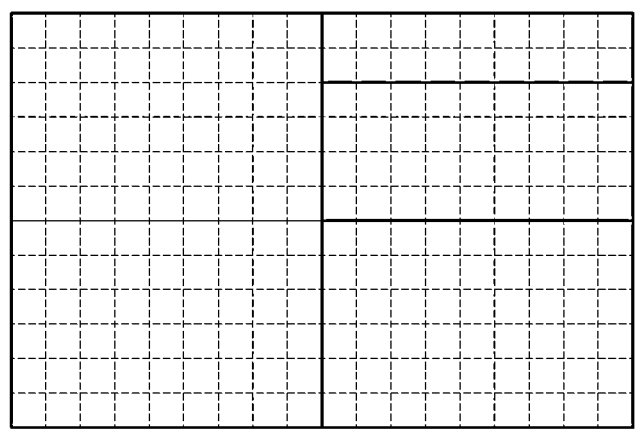

In order to describe the partitioning relationship of a picture in greater detail, a description will be given with reference to FIGS. 8 to 11. FIGS. 8 to 11 illustrate embodiments of partitioning a picture using a tile, a slice and a subpicture. FIG. 8 shows an example of a picture partitioned into 12 tiles and three raster-scan slices. FIG. 9 shows an example of a picture partitioned into 24 tiles (six tile columns and four tile rows) and 9 rectangular slices. FIG. 10 shows an example of a picture partitioned into four tiles (two tile columns and two tile rows) and four rectangular slices.

Figure 11:
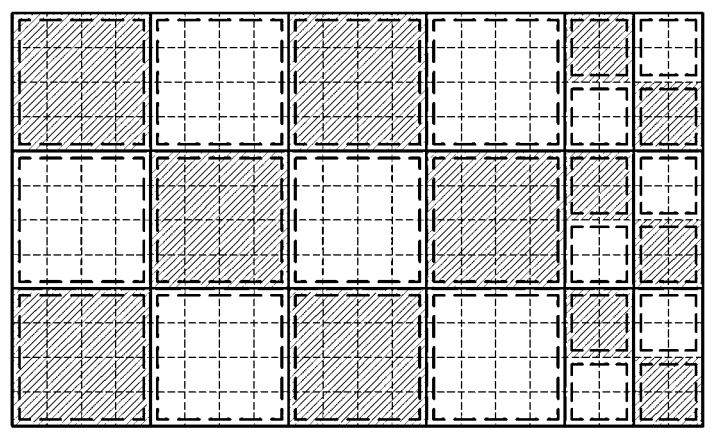

FIG. 11 shows an example of partitioning a picture into subpictures. In FIG. 11, the picture may be partitioned into 12 left tiles covering one slice composed of 4×4 CTUs and six right tiles covering vertically assembled two slices composed of 2×2 CTUs, such that one picture is partitioned into 24 slices and 24 subpictures having different areas. In the example of FIG. 11, an individual slice corresponds to an individual subpicture.

Quantization/Dequantization

As described above, the quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients.

In encoding and decoding of moving image/still image, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In a quantization process, a transform coefficient C may be received as input and divided by quantization rate Qstep, and a quantized transform coefficient C' may be obtained based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. By applying the quantization scale to the transform coefficient C, the quantized transform coefficient C' may be derived based on this.

A dequantization process is an inverse process of the quantization process, and the quantized transform coefficient C' may be multiplied by the quantization rate Qstep and a reconstructed transform coefficient C" may be obtained based on this. In this case, a level scale may be derived according to the quantization parameter, the level scale may be applied to the quantization transform coefficient C', and the reconstructed transform coefficient C" may be derived based on this. The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may apply. The adaptive frequency weighting quantization technology is a method of differently applying a quantization strength according to the frequency. In adaptive frequency weighting quantization, the quantization strength may differently apply according to the frequency using a predefined quantization scaling matrix. That is, the above-described quantization/dequantization process may be performed further based on the quantization scaling matrix. For example, a different quantization scaling matrix may be used according to a size of a current block and/or whether a prediction mode applying to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data. Based on the scaling list data, the (modified) quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Transform/Inverse Transform

As described above, the encoding apparatus may derive a residual block (residual samples) based on a block (prediction blocks) predicted through intra/inter/IBC prediction, and derive quantized transform coefficients by applying transform and quantization to the derived residual samples. Information on the quantized transform coefficients (residual information) may be included and encoded in a residual coding syntax and output in the form of a bitstream. The decoding apparatus may acquire and decode information on the quantized transform coefficients (residual information) from the bitstream to derive quantized transform coefficients. The decoding apparatus may derive residual samples through dequantization/inverse transform based on the quantized transform coefficients. As described above, at least one of quantization/dequantization and/or transform/inverse transform may be skipped. When transform/inverse transform is skipped, the transform coefficient may be referred to as a coefficient or a residual coefficient or may still be referred to a transform coefficient for uniformity of expression. Whether transform/inverse transform is skipped may be signaled based on a transform skip flag (e.g., transform_skip_flag).

Transform/inverse transform may be performed based on transform kernel(s). For example, a multiple transform selection (MTS) scheme for performing transform/inverse transform is applicable. In this case, some of a plurality of transform kernel sets may be selected and applied to a current block. A transform kernel may be referred to as various terms such as a transform matrix or a transform type. For example, the transform kernel set may indicate a combination of a vertical-direction transform kernel (vertical transform kernel) and a horizontal-direction transform kernel (horizontal transform kernel).

Transform/inverse transform may be performed in units of CU or TU. That is, transform/inverse transform is applicable to residual samples in a CU or residual samples in a TU. A CU size may be equal to a TU size or a plurality of TUs may be present in a CU region. Meanwhile, the CU size may generally indicate a luma component (sample) CB size. The TU size may generally indicate a luma component (sample) TB size. A chroma component (sample) CB or TB size may be derived based on the luma component (sample) CB or TB size according to a component ratio according to a color format (chroma format) (e.g., 4:4:4, 4:2:2, 4:2:0, etc.). The TU size may be derived based on maxTbSize. For example, when the CU size is greater than maxTbSize, a plurality of TUs (TBs) of maxTbSize may be derived from the CU and transform/inverse transform may be performed in units of TU (TB). maxTbSize may be considered to determine whether to apply various intra prediction types such as ISP. Information on maxTbSize may be predetermined or may be generated and encoded in the encoding apparatus and signaled to the decoding apparatus.

Entropy Coding

Some or all of video/image information may be entropy-encoded by the entropy encoder 190 as described above with reference to FIG. 2, and some or all of video/image information described with reference to FIG. 3 may be entropy-decoded by the entropy decoder 210. In this case, the video/image information may be encoded/decoded in units of syntax elements. In the present disclosure, encoding/decoding information may include encoding/decoding by the method described in this paragraph.

Figure 12:
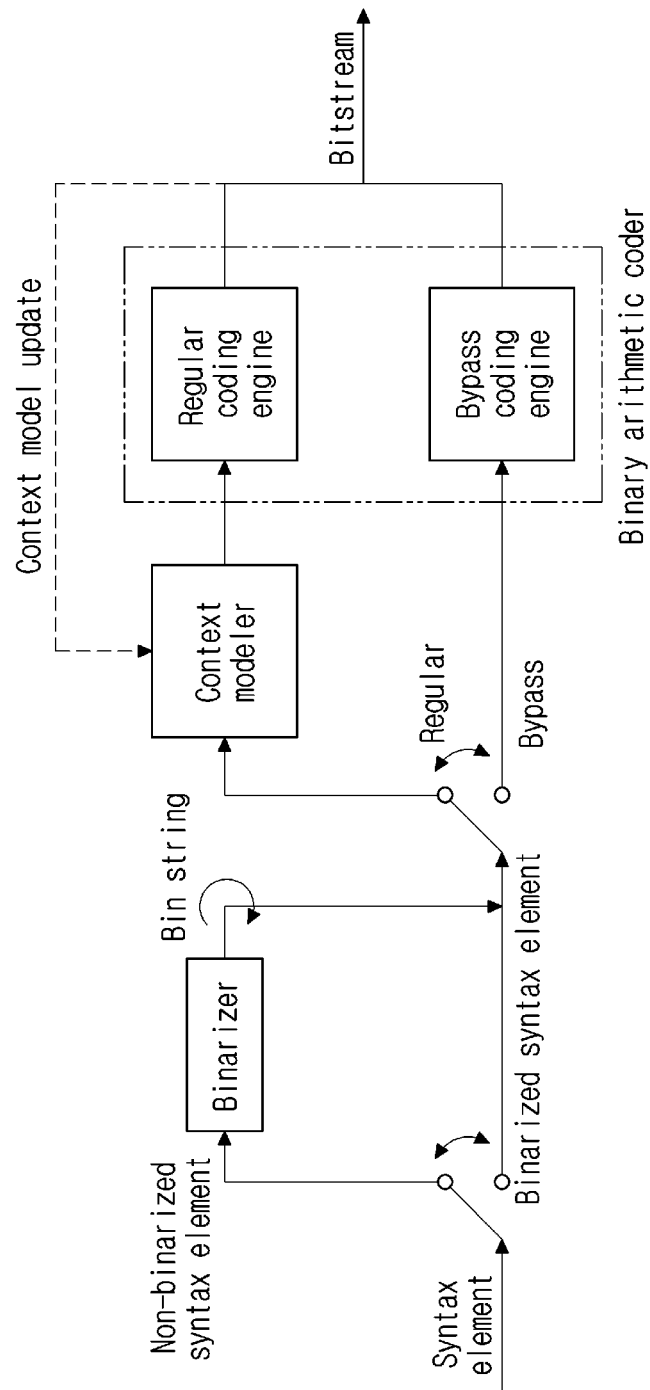
FIG. 12 is a block diagram of CABAC according to an embodiment for encoding one syntax element.

FIG. 12 is a block diagram of CABAC according to an embodiment for encoding one syntax element. In an encoding process of CABAC, first, when an input signal is a syntax element having a non-binary value, the input signal may be transformed into a binary value through binarization. When the input signal already has a binary value, binarization may be bypassed without being performed. Here, a binary number 0 or 1 constructing a binary value may be referred to as a bin. For example, when a binary string (bin string) after binarization is 110, each of 1, 1 and 0 may be referred to as one bin. The bin(s) for one syntax element may specify the value of the corresponding syntax element.

The binarized bins may be input to a regular coding engine or a bypass coding engine. The regular coding engine may allocate a context model reflecting a probability value to the corresponding bin and encode the corresponding bin based on the allocated context model. In the regular coding engine, after performing coding on each bin, a probabilistic model for the corresponding bin may be updated. The bins coded in this way may be referred to as context-coded bins. In the bypass coding engine, a procedure for estimating a probability for the input bin and a procedure for updating a probabilistic model applying to the corresponding bin after coding may be omitted. In the case of the bypass coding engine, instead of allocating context, a coding rate may be improved by coding a bin input by applying a uniform probability distribution (e.g., 50:50). The bins coded in this way may be referred to as bypass bins. The context model may be allocated and updated for each context-coded (regularly coded) bin, and the context model may be specified based on ctxidx or ctxInc. ctxidx may be derived based on ctxInc. Specifically, for example, a context index ctxidx specifying a context model for each of the regularly coded bins may be derived as a sum of a context index increment ctxInc and a context index offset ctxIdxOffset. Here, ctxInc may be derived differently for each bin. ctxIdxOffset may be represented by the lowest value of ctxIdx. The lowest value of ctxIdx may be referred to as an initial value initValue of ctxIdx. ctxIdxOffset is a value used for distinguishment with context models for other syntax elements, and a context model for one syntax element may be distinguished/derived based on ctxinc.

In the entropy encoding procedure, whether encoding is performed through the regular coding engine or the bypass coding engine may be determined and a coding path may be switched. In entropy decoding, the same process as entropy encoding may be performed in reverse order.

Figure 13:
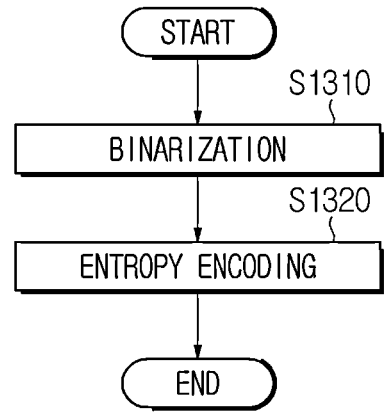
FIGS. 13 to 16 are views illustrating entropy encoding and decoding according to an embodiment.
Figure 14:
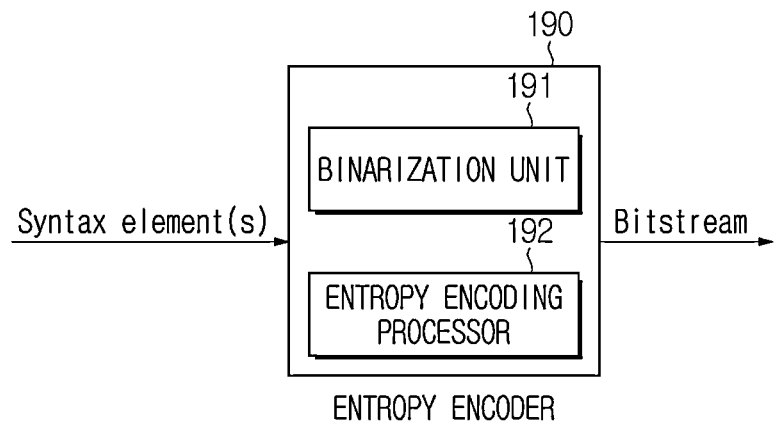

The above-described coding may be performed, for example, as shown in FIGS. 13 and 14. Referring to FIGS. 13 and 14, the encoding apparatus (entropy encoder) may perform an entropy coding procedure of image/video information. The image/video information may include partitioning related information, prediction related information (e.g., inter/intra prediction classification information, intra prediction mode information, inter prediction mode information, etc.), residual information, in-loop filtering related information, etc., or various syntax elements related thereto. The entropy coding may be performed in units of syntax elements. Steps S1310 to S1320 of FIG. 13 may be performed by the entropy encoder 190 of the encoding apparatus of FIG. 2.

The encoding apparatus may perform binarization on a target syntax element (S1310). Here, binarization may be based on various binarization methods such as a Truncated Rice binarization process, a Fixed-length binarization process, etc., and the binarization method for the target syntax element may be predefined. The binarization procedure may be performed by a binarization unit 191 in the entropy encoder 190.

The encoding apparatus may perform entropy encoding on the target syntax element (S1320). The encoding apparatus may regular-coding-based (context-based) or bypass-coding-based encode a bin string of the target syntax element based on an entropy coding technique such as context-adaptive arithmetic coding (CABAC) or context-adaptive variable length coding (CAVLC), and the output thereof may be included in a bitstream. The entropy encoding procedure may be performed by an entropy encoding processor 192 in the entropy encoder 190. The bitstream may be transmitted to the decoding apparatus through a (digital) storage medium or a network as described above.

Figure 15:
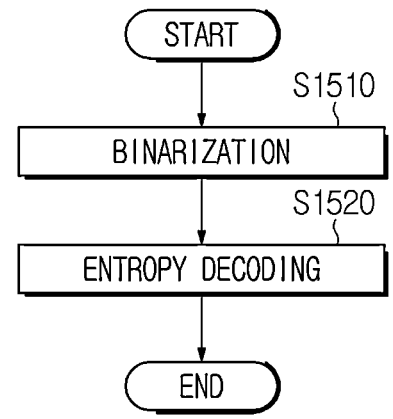
Figure 16:
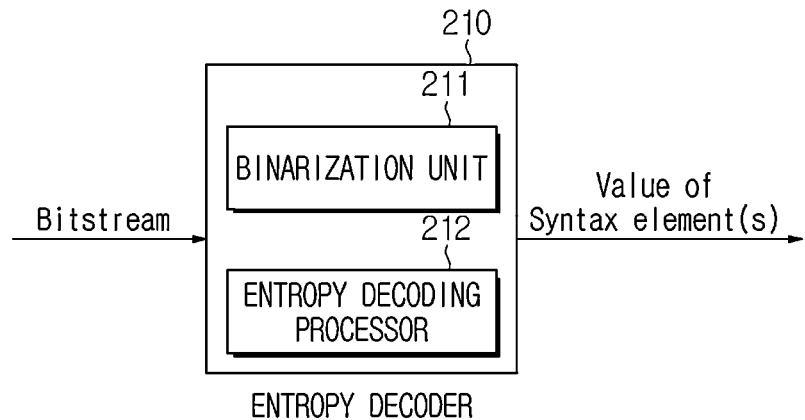

Referring to FIGS. 15 and 16, the decoding apparatus (entropy decoder) may decode encoded image/video information. The image/video information may include partitioning related information, prediction related information (e.g., inter/intra prediction classification information, intra prediction mode information, inter prediction mode information, etc.), residual information, in-loop filtering related information, etc., or various syntax elements related thereto. The entropy coding may be performed in units of syntax elements. Steps S1510 to S1520 may be performed by the entropy decoder 210 of the decoding apparatus of FIG. 3.

The decoding apparatus may perform binarization on a target syntax element (S1510). Here, binarization may be based on various binarization methods such as Truncated Rice binarization process, Fixed-length binarization process, etc., and the binarization method for the target syntax element may be predefined. The decoding apparatus may derive available bin strings (bin string candidates) for available values of the target syntax element through the binarization procedure. The binarization procedure may be performed by a binarization unit 211 in the entropy decoder 210.

The decoding apparatus may perform entropy decoding on the target syntax element (S1520). The decoding apparatus may compare the derived bin string with available bin strings for the corresponding syntax element, while sequentially decoding and parsing bins for the target syntax element from input bit(s) in the bitstream. If the derived bin string is equal to one of the available bin strings, a value corresponding to the corresponding bin string may be derived as a value of the corresponding syntax element. If not, a next bit in the bitstream may be further parsed and then the above-described procedure may be performed again. Through this process, the corresponding information may be signaled using a variable length bit without using a start bit or an end bit for specific information (specific syntax element) in the bitstream. Through this, relatively fewer bits may be allocated to a low value and overall coding efficiency may be increased.

The decoding apparatus may context-based or bypass-coding-based decode each bin in the bin string from the bitstream based on an entropy coding technique such as CAB AC or CAVLC. The entropy decoding procedure may be performed by an entropy decoding processor 212 in the entropy decoder 210. The bitstream may include a variety of information for image/video decoding as described above. The bitstream be transmitted to the decoding apparatus through a (digital) storage medium or a network as described above.

In this disclosure, a table (syntax table) including syntax elements may be used to specify signaling of information from the encoding apparatus to the decoding apparatus. The order of the syntax elements of the table including the syntax elements used in this disclosure may specify a parsing order of the syntax elements from the bitstream. The encoding apparatus may construct and encode the syntax table such that the syntax elements are parsed by the decoding apparatus in parsing order, and the decoding apparatus may obtain values of the syntax elements by parsing and decoding the syntax elements of the syntax table from the bitstream in parsing order.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 17:
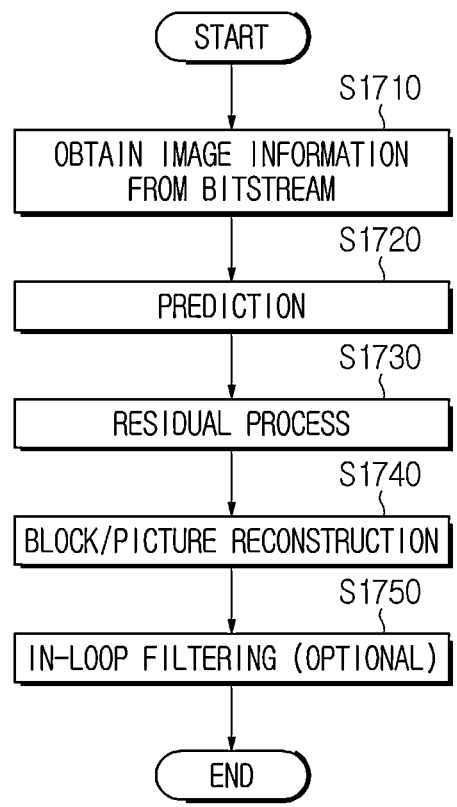
FIGS. 17 and 18 are views illustrating an example of a picture decoding and encoding procedure according to an embodiment.

FIG. 17 shows an example of a schematic picture decoding procedure, to which embodiment(s) of the present disclosure is applicable. In FIG. 17, S1710 may be performed in the entropy decoder 210 of the decoding apparatus described above with reference to FIG. 3, S1720 may be performed in a prediction unit including the intra prediction unit 265 and the inter prediction unit 260, S1730 may be performed in a residual processor including the dequantizer 220 and the inverse transformer 230, S1740 may be performed in the adder 235, and S1750 may be performed in the filter 240. S1710 may include the information decoding procedure described in the present disclosure, S1720 may include the inter/intra prediction procedure described in the present disclosure, S1730 may include a residual processing procedure described in the present disclosure, S1740 may include the block/picture reconstruction procedure described in the present disclosure, and S1750 may include the in-loop filtering procedure described in the present disclosure.

Referring to FIG. 17, the picture decoding procedure may schematically include a procedure for obtaining image/video information (through decoding) from a bitstream (S1710), a picture reconstruction procedure (S1720 to S1740) and an in-loop filtering procedure for a reconstructed picture (S1750), as described above with reference to FIG. 3. The picture reconstruction procedure may be performed based on prediction samples and residual samples obtained through inter/intra prediction (S1720) and residual processing (S1730) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S1750) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 18:
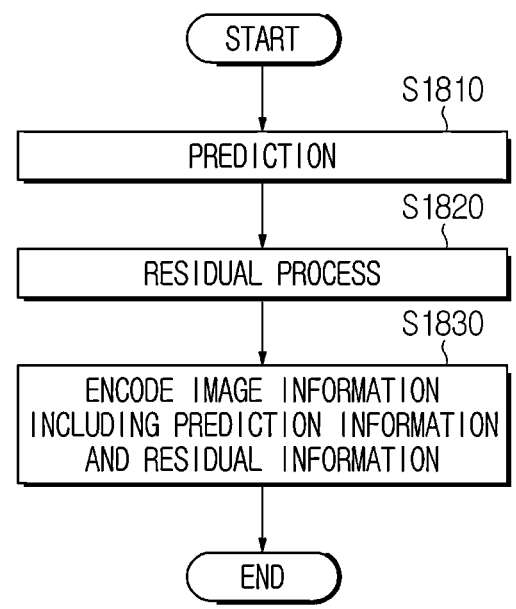

FIG. 18 shows an example of a schematic picture encoding procedure, to which embodiment(s) of the present disclosure is applicable. In FIG. 14, S1810 may be performed in the prediction unit including the intra prediction unit 185 or inter prediction unit 180 of the encoding apparatus described above with reference to FIG. 2, S1820 may be performed in a residual processor including the transformer 120 and/or the quantizer 130, and S1830 may be performed in the entropy encoder 190. S1810 may include the inter/intra prediction procedure described in the present disclosure, S1820 may include the residual processing procedure described in the present disclosure, and S1830 may include the information encoding procedure described in the present disclosure.

Referring to FIG. 18, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples, which are output of S1810, and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 19:
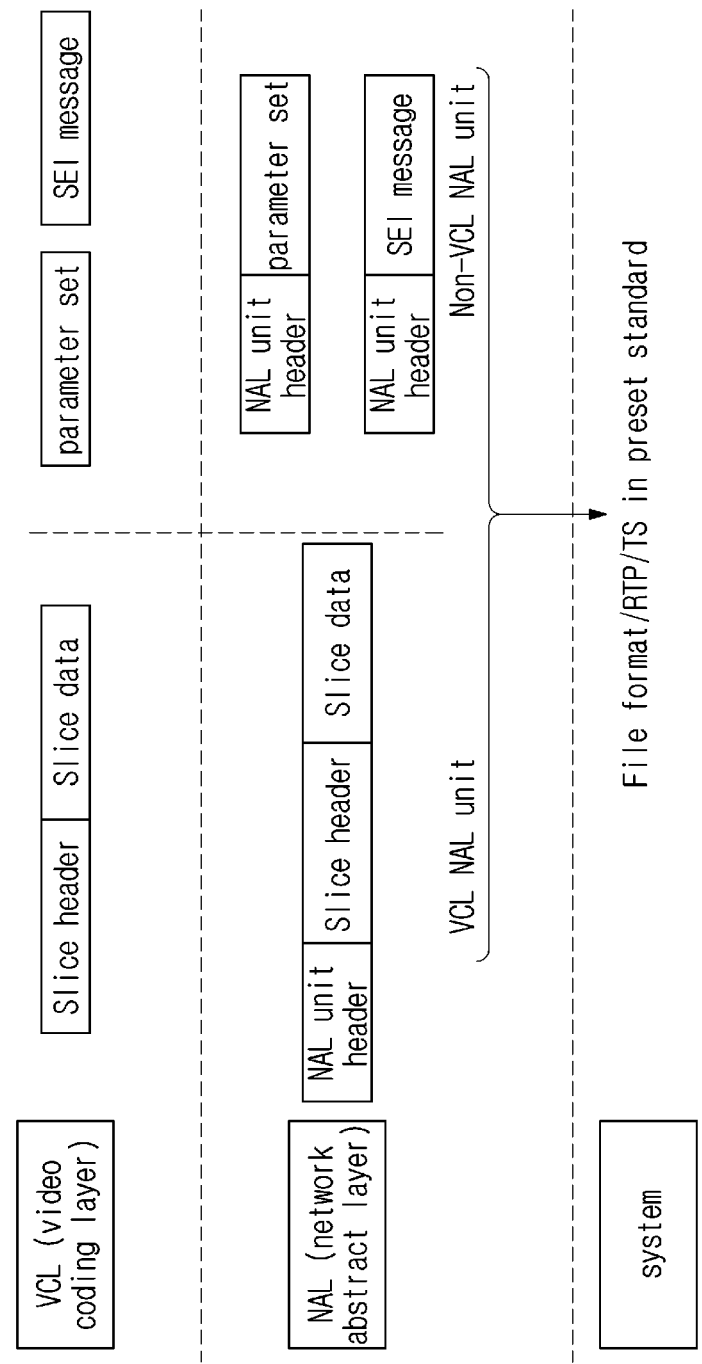
FIG. 19 is a view showing a hierarchical structure for a coded image.

FIG. 19 is a view showing a hierarchical structure for a coded image. The coded image may be classified into a video coding layer (VCL) for an image decoding process and handling itself, a low-level system for transmitting and storing encoded information, and a network abstraction layer (NAL) present between the VCL and the low-level system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated. In the above information/message, task information capable of being performed through an encoded image and additional information on an image, such as a method of generating an encoding target image, may be described as a syntax element according to a predetermined syntax table.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image. According to an embodiment, information indicating that the encoded image is image information for performing a specific task may be included in the VCL NAL unit. Alternatively, information indicating that the encoded image is image information for performing a specific task may be included in the non-VCL NAL unit.

The VCL NAL unit and the Non-VCL NAL unit may be attached with header information and transmitted through a network according to the data standard of the low-level system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signalled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types may have syntax information for a NAL unit type, and the syntax information may be stored in a NAL unit header and signalled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DCI (DCI syntax) may include information/parameters commonly applicable to overall video. The DCI may include information/parameters related to decoding capability. In the present disclosure, high level syntax (HLS) may include at least one of the APS syntax, the PPS syntax, the SPS syntax, the VPS syntax, the DCI syntax, the picture header syntax or the slice header syntax. Meanwhile, in the present disclosure, low level syntax (LLS) may include, for example, slice data syntax, CTU syntax, coding unit syntax, transform unit syntax, etc.

In the present disclosure, image/video information encoded in the encoding apparatus and signalled to the decoding apparatus in the form of a bitstream may include not only in-picture partitioning related information, intra/inter prediction information, residual information, in-loop filtering information but also information on the slice header, information on the APS, information on the PPS, information on the SPS, information on the VPS and/or information on the DCI. In addition, the image/video information may further include general constraint information and/or information on a NAL unit header.

HLS (High Level Syntax) Signaling and Semantics

As described above, the HLS may be encoded and/or signaled for video and/or image encoding. As described above, in the present disclosure, video/image information may be included in the HLS. In addition, the image/video encoding method may be performed based on such image/video information. For example, especially when applied to VCM, the video/image information may include information indicating which AI task the encoded information is encoded for, and which network (e.g. neural network) is used to encode the encoded information, and/or information indicating for what purpose the encoded information is encoded. In an embodiment, even if the corresponding image is an image having general characteristics having a general task, network, and/or use, a value thereof shall be described.

Overview and Embodiment of Video/Image Coding (Encoding/Decoding) for Machines (VCM)

Hereinafter, in order to obtain and/or use necessary information from a part of a video source and/or a video source according to a user and/or machine's request, a purpose and/or a surrounding environment, a method of extending and/or redesigning the above-described video/image encoding system will be described. The extended and/or redesigned video/image encoding system may be implemented as a video/image encoding apparatus and/or a video decoding apparatus for machines. Here, the machine may mean a general device, terminal, or machine.

In the following description, video coding for machines (VCM) means obtaining necessary information from a part of a video source and/or a video source according to a user and/or machine's request, a purpose, and a surrounding environment and encoding/decoding it. As such, a part of and/or information on a video source to be encoded in VCM may be referred to as a feature. In addition, the feature may be information extracted from a video source according to a user and/or machine's request, a purpose, and a surrounding environment, and may mean a set of a series of information according to the passage of time.

Figure 20:
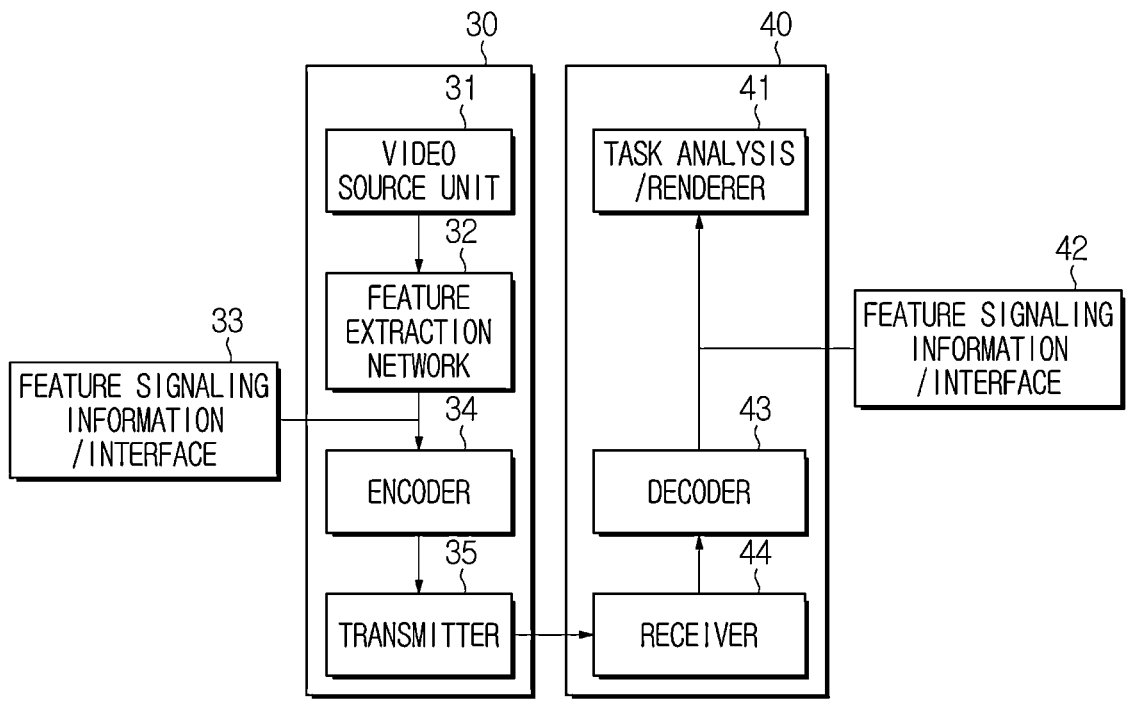
FIG. 20 is a diagram illustrating an embodiment of a video/image encoding apparatus and/or a video decoding apparatus for machines.

FIG. 20 is a diagram illustrating an embodiment of a video/image encoding apparatus and/or a video decoding apparatus for machines. Referring to FIG. 20, the VCM system may include a source device 30 and a reception device 40. The source device 30 may transmit encoded feature information to the reception device 40 through a storage medium or a network. The source device 30 and the reception device 40 may be used by humans and/or machines, respectively.

The video source unit 31 may acquire a video/image through a process of capturing, synthesizing, or generating a video/image. The video source unit 31 may include a video/image capture device and/or a video/image generating device.

A feature extraction network 32 may obtain a feature from the video/image obtained from the video source unit 31. The feature extraction network 32 may include a video/image capture device and/or a video/image generation device. The feature may be information extracted/processed by the video source unit 31 according to a user and/or machine's request, a purpose, and a surrounding environment, and may mean a set of a series of information according to the passage of time.

In FIG. 20, a feature signaling information/interface 33 in the source device 30 refers to information signaled between the feature extraction network 32 and an encoder 34 and/or an interface between the feature extraction network 32 and the encoder 34. In addition, in FIG. 20, the feature signaling information/interface 42 in the reception device 40 refers to information signaled between a decoder 43 and a task analysis/renderer 41 and/or an interface between the decoder 43 and the task analysis/renderer 41. The feature signaling information/interfaces 33 and 42 may include information on the feature such as type, acquisition method, purpose, etc. of the feature acquired through the feature extraction network 32, and may include information on requesting necessary information/operation from the feature extraction network 32.

The encoder 34 may perform a series of procedures such as prediction, transform, and quantization for feature compression and coding efficiency. Encoded data (encoded feature information) may be output in the form of a bitstream.

A transmitter 35 may generate a storage medium for transmitting the encoded feature output in the form of a bitstream to a receiver of the reception device 40. To this end, the transmitter 35 may include an element for generating a media file through a predetermined file format. In an embodiment, the storage medium may include various digital storage media such as USB, SD, CD, DVD, Blu-ray, HDD, SSD, and the like.

In addition, the transmitter 35 may transmit the bitstream including the encoded feature to the receiver of the reception device through a transmission network. To this end, the transmitter 35 may include an element for transmission through a broadcast/communication network.

A receiver 44 of the reception device 40 may receive the bitstream including the feature information, extract feature information therefrom and transmit it to the decoder 43.

The decoder 43 may decode a video/image by performing a series of procedures such as dequantization, inverse transformation, and prediction corresponding to operation of the encoder 34.

The task analysis/renderer 41 may render the feature decoded in the decoder 43. In addition, the task analysis/renderer 41 may perform a task of a user or a machine using the decoded feature. Examples of tasks may include AI such as face recognition, behavior recognition and lane recognition, computer vision tasks, and the like.

The present disclosure provides various embodiments related to feature acquisition and coding, and, unless otherwise noted, the embodiments may be combined with each other. For example, the VCM technology disclosed in the present disclosure may be utilized in a monitoring system. For example, VCM technology may be applied to perform tasks such as recognizing and tracking an object/person. VCM may also be used for the purpose of transmitting or storing information obtained from surveillance cameras.

Alternatively, VCM may be utilized in the field of intelligent transportation. Each vehicle constituting a smart traffic system may collect location information collected from a GPS, sensor information necessary for autonomous driving and safety, such as cameras, LIDAR, radar, and ultrasonic sensors, and various vehicle control information. (brakes, wipers, headlights, etc.) and transmit them to other vehicles or infrastructure. An original image or processed image signal collected from various sensors may be compressed with VCM and transmitted, and, in this case, 5G data network may be used for data transmission.

Alternatively, VCM may be utilized in the smart city field. In a smart city system, interconnected node sensors and devices may transmit information necessary to perform their respective tasks using VCM technology. Examples of the tasks of the smart city may include monitoring traffic conditions, measuring and predicting density, predicting traffic flows and allocating resources. In addition, the method/embodiment disclosed in the present disclosure may be applied to a method disclosed in a Video Coding for Machines (VCM) standard.

The following embodiments relate to a feature extraction network/encoder/decoder in the aforementioned VCM, and relate to a method of performing encoding and decoding independently of the applied feature extraction method. The compression target of the encoder may be a feature extracted through a feature extraction network or a feature map which is a set of pictures.

Figure 21:
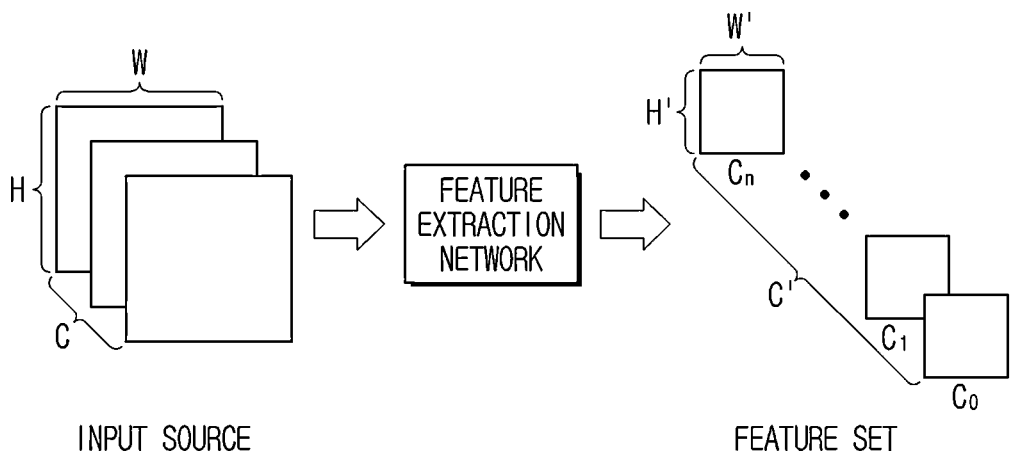
FIG. 21 is a diagram illustrating an example of feature extraction using a feature extraction network.

FIG. 21 is a diagram illustrating an example of feature extraction using a feature extraction network. A width, a height, and a channel size of an input source that is a feature extraction target may be denoted by W, H, and C, respectively. For example, for RGB input values, C may be 3. The width, height, and channel size of the extracted feature may be denoted by W', H', and C', respectively. C' of the output value means the number of features constituting a feature set (feature map), and may generally have a value greater than the value of C of the input source. Each feature may be represented by C0, C1, . . . , Cn, and n may have a value of C'-1.

In the case of FIG. 21, the properties of the feature set to be compressed by the encoder may be represented by W', H', and C'. These properties may vary depending on where/how the feature was extracted. For example, properties of a feature extracted from an upper layer may be different from those of a feature extracted from a lower layer. In addition, it may also vary depending on the type of network used for extraction.

Figure 22:
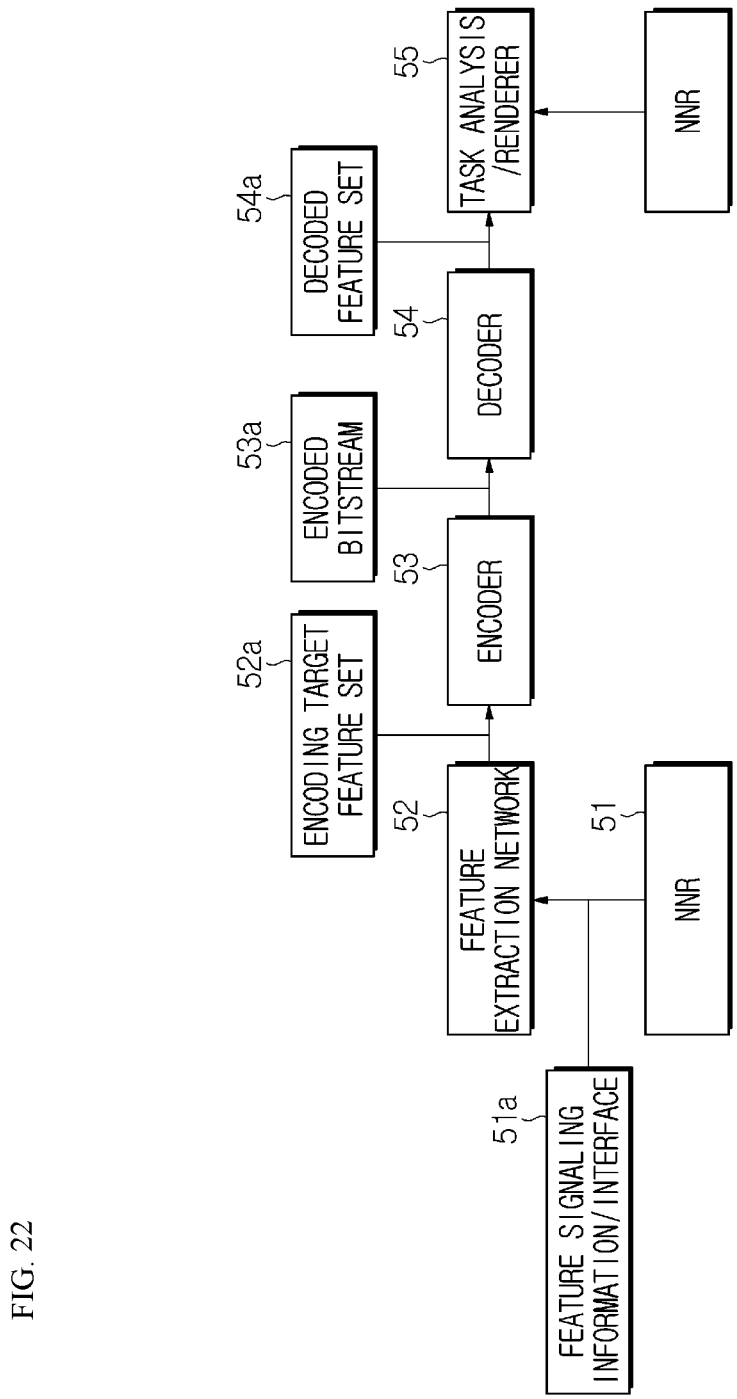
FIG. 22 is a view illustrating an example of a VCM encoding/decoding structure.

FIG. 22 illustrates an example of a VCM encoding/decoding structure.

NNR (Neural Network Representation) 51 represents a compression representation method of a neural network for multimedia content description and interpretation. For example, the NNR 51 may compress the neural network through a process of reducing a parameter that is a weight constituting the neural network (reduction), a process of quantizing the reduced parameter value (quantization), and a process of entropy encoding the quantized parameter value. For example, the NNR 51 may be an operation unit that performs a neural network compression representation method defined in the MPEG-7 NNR standard. The NNR 51 may represent different types of artificial neural networks.

The NNR 51 and a feature signaling information/interface 51a may perform a function of replacing the feature extraction method (e.g., neural network) used in the feature extraction network 52. Using this function, when the extraction method is replaced (e.g., when another neural network is used), the properties of the feature set 52a output through the feature extraction network 52 may be changed. Therefore, in the encoder 53, there is a need for a method of encoding the feature set 52a having various properties input to the encoder 53 or a method of changing the feature set 52a having various properties input to the encoder 53 to a form which may be encoded. To this end, it may be essential to pre-define the feature set 52a and a method of changing the feature set 52a to the form which may be encoded. However, since the properties of the feature set 52a may be changed, there is a limit in that the encoder 53 copes therewith. In addition, there is a problem in that the structure of the encoder 53 is dependent on the structure 52 of the feature extraction network, thereby reducing the independence of the encoder 53.

After the bitstream 53a encoded by the encoder 53 is decoded by the decoder 54, it may need to be changed to a form usable by the task analysis/renderer 55. To this end, the method of changing the feature set 52a into an encoded form may be applied in reverse. Through this, the decoded feature set 54a may have the same form as the feature set 52a which is the encoding target. For this purpose, the structure of the decoder 54 is dependent on the structure of the feature extraction network 52, and thus there is a problem in that the independence of the decoder 54 is deteriorated.

A problem of the VCM encoding/decoding structure shown in FIG. 22 is that independence between components constituting VCM is not guaranteed. Since independence between the components constituting VCM are not guaranteed, an interface and information for transmitting changes between the components are required. However, since the range of these changes may not be determined, it is difficult to pre-define standards and methods for them.

Embodiment 1

Figure 23:
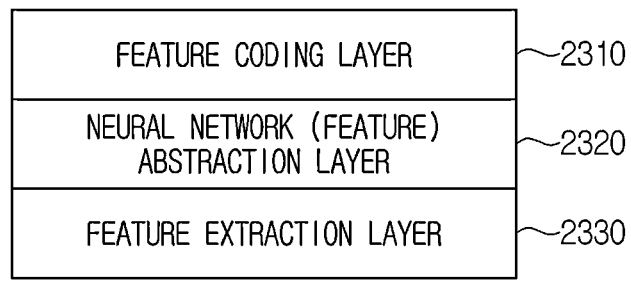
FIG. 23 is a view illustrating an example of a hierarchical structure of VCM proposed in the present disclosure.

FIG. 23 illustrates an example of a hierarchical structure of VCM proposed in the present disclosure. FIG. 23 illustrates a VCM hierarchical structure composed of a feature coding layer 2310, a neural network (feature) abstraction layer 2320, and a feature extraction layer 2330.

The feature extraction layer 2330 of FIG. 23 means a layer for extracting a feature from an input source, and may also include a result of extraction. The feature extraction layer 2330 may include the feature extraction network 52 of FIG. 22 and an extraction result thereof.

The feature coding layer 2310 of FIG. 23 is a layer for compressing a feature and means a layer for compressing an extracted feature, and may also include a result of compression. In this regard, it may be said that the feature coding layer 2310 includes the encoder 53 of FIG. 22 and a compression result thereof.

In this regard, if there is no neural network abstraction layer 2320 of FIG. 23, the target of compression of the feature coding layer 2310 is determined by the feature extraction layer 2330, and the feature coding layer 2310 shall access information on the feature extraction layer 2330 that is changeable and complex. Also, in general, if the target of compression is determined, the method of compression may be sequentially developed accordingly. As a result, there is inevitably a limitation in the delay of development and the scalability of functions. In addition, according to the change of the target of compression, the compression method may be individually developed accordingly, and it may be difficult to integrate each coding tool later.

The neural network abstraction layer 2320 proposed in the present disclosure may aim at abstracting changes and differences of the feature extraction layer 2330 to provide an environment in which the feature coding layer 2310 may operate consistently. For example, the neural network compression layer 2320 may aim at hiding the inside of the feature extraction layer 2330 and providing a consistent interface and feature.

Through the present disclosure, the feature coding layer 2310 may operate independently of changes in the feature extraction layer 2330 to ensure independence. In an embodiment, an interface between the feature extraction layer 2330 and the neural network abstraction layer 2320 and an interface between the feature coding layer 2310 and the neural network abstraction layer 2320 may be predefined, and operation in the neural network abstraction layer may be changed later. In this case, even if the design and/or operation of the feature extraction layer 2330 is changed, the design and/or operation of the feature coding layer 2310 may be maintained without change.

Figure 24:
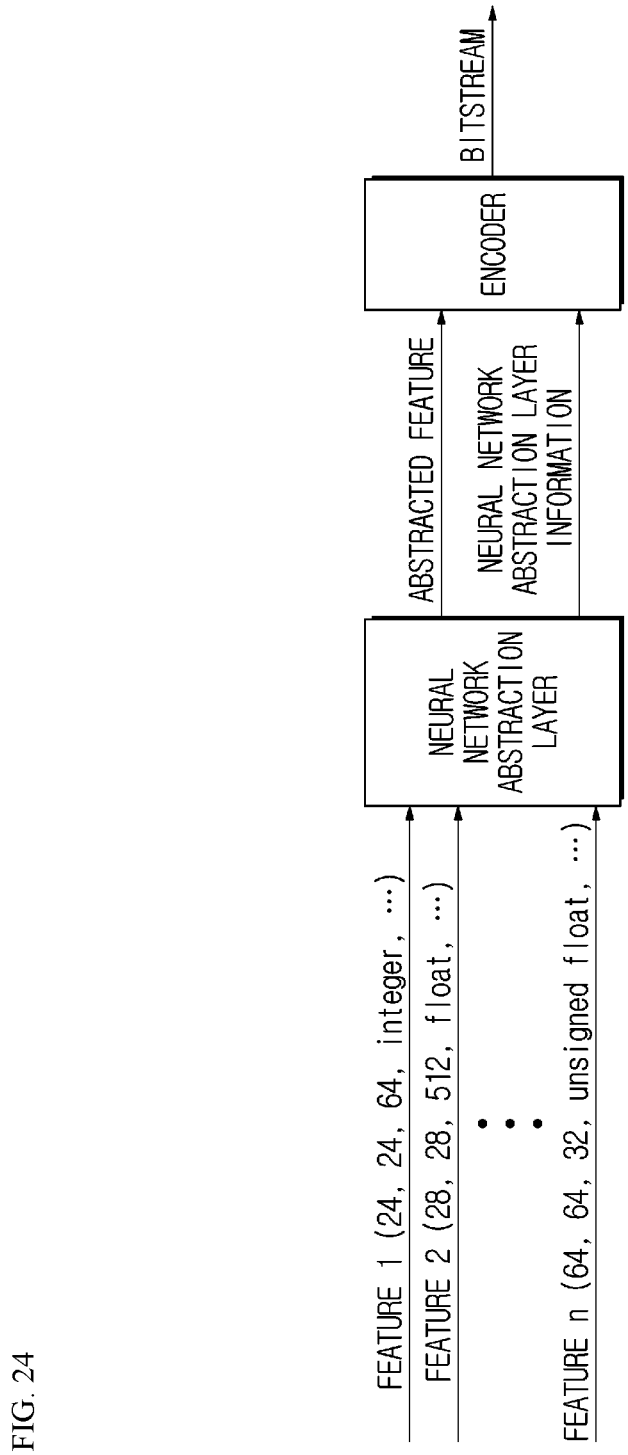
FIG. 24 is a diagram illustrating a feature abstracted through an NNAL abstraction process and neural network abstraction layer information (NNAL information).

FIG. 24 is a diagram illustrating an example of operation of the neural network abstraction layer. In the present disclosure, the neural network abstraction layer has the same meaning as the feature abstraction layer, and is hereinafter abbreviated as NNAL. FIG. 24 shows that feature 1, feature 2, . . . , feature n are input as NNAL inputs. Each feature may have different properties. The features shown in FIG. 24 may have different properties, for example, properties such as width (W), height (H), channel (C) and data type. The table below shows an example of available feature properties. Meanwhile, the table below is only an example, and feature properties may not be limited to the information listed in the table below.

TABLE 2

| Property | Description |
| --- | --- |
| Width | Width of feature |
| Height | Height of feature |
| Channel | Number of features constituting feature set |
| Data Type | Type of each value of feature (e.g., integer, decimal, negative number, positive number, etc.) |
| Network Type | Method used for feature extraction (e.g., VGG16, shared backbone, etc.) |
| Extracted layer | Position of extracted feature (e.g., convolution layer 4, etc.) |
| Input source | Properties of input source (e.g., size, frame rate, data type, etc.) |

FIG. 24 illustrates output of a feature abstracted through the NNAL abstraction process and neural network abstraction layer information (NNAL information). These two pieces of information may be transmitted separately or may be transmitted as a single stream. The abstracted feature may mean an abstracted feature of a predefined type that may be processed by the encoder. The NNAL information may be information necessary to re-materialize the abstracted feature. The NNAL information may include a method used to abstract a feature, a method of materialize a feature, and/or information on the abstracted feature (e.g., standard information, etc.). The abstraction process may refer to abstracting various types of features such as feature 1, feature 2, . . . , feature N of FIG. 24 into a defined form that may be encoded by the encoder. In order to define an abstraction process, it may be necessary to first define an abstracted output (e.g., a form that may be encoded). Any method may be employed as the input information and abstraction method of NNAL, but the output thereof may have to be output as defined in advance. The table below shows an example of the definition of the abstracted output property of the feature, and the definition thereof is not limited by the table below and may have other values.

TABLE 3

| Abstracted feature property | Description |
| --- | --- |
| Bit range | One value bit range (e.g., 8-16 bits) that constitutes the abstracted feature. Value of abstracted feature may be limited to predefined range |
| Data type | The value represented by the abstracted feature may be limited to a predefined range (e.g., 0 to 255, integer, positive number, decimal, etc.) |

TABLE 3-continued

| Abstracted feature property | Description |
| --- | --- |
| Data representation | The expression and composition form of abstracted feature may be limited to a predefined range (e.g., how to construct feature set such as aspect ratio, tiling, etc., how to construct and express temporally continuous feature sets, how to transform a specific feature (e.g. omit, emphasize, weaken, etc.) |
| Size | The size of the abstracted feature shall be distributed within a predefined size range (e.g., width has a value from 16 to 1920, height has a value from 16 to 1080) |

The table below shows an embodiment of NNAL information. The NNAL information may contain information necessary to reconstruct the abstracted feature back to the input feature. The NNAL information and the encoded abstracted feature may be composed of one bitstream. As described above, the bitstream constructed as described above may be stored in a storage medium through the transmitter of FIG. 20 or transmitted through a network.

TABLE 4

| NNAL | Description |
| --- | --- |
| Input feature technology | Feature properties described in Table 2 may be utilized |
| Abstracted feature technology | Abstracted feature properties described in Table 3 may be used |
| Bit range change method | Method used to change the bit range of the input feature to the bit range of the abstracted feature, and/or method for reconstructing the bit range of the input feature may be used. |
| Additional information for bit range change | It may be additional information required to change the bit range (e.g., information on a quantization range (maximum, minimum, average, variance, etc.), if a change using a neural network is required, information for driving the neural network, etc.) |
| Data representation change method | Methods of reconstructing the data representation of the abstracted feature to the representation of the input feature may be used |
| Additional information for data representation change | Additional information necessary to change the data representation may be used (e.g., information for reconstructing a tiled feature set back to the feature unit, information necessary to reconstruct a highlighted/weakened/omitted feature, and information for driving it when reconstruction using a neural network is required, etc.) |

Figure 25:
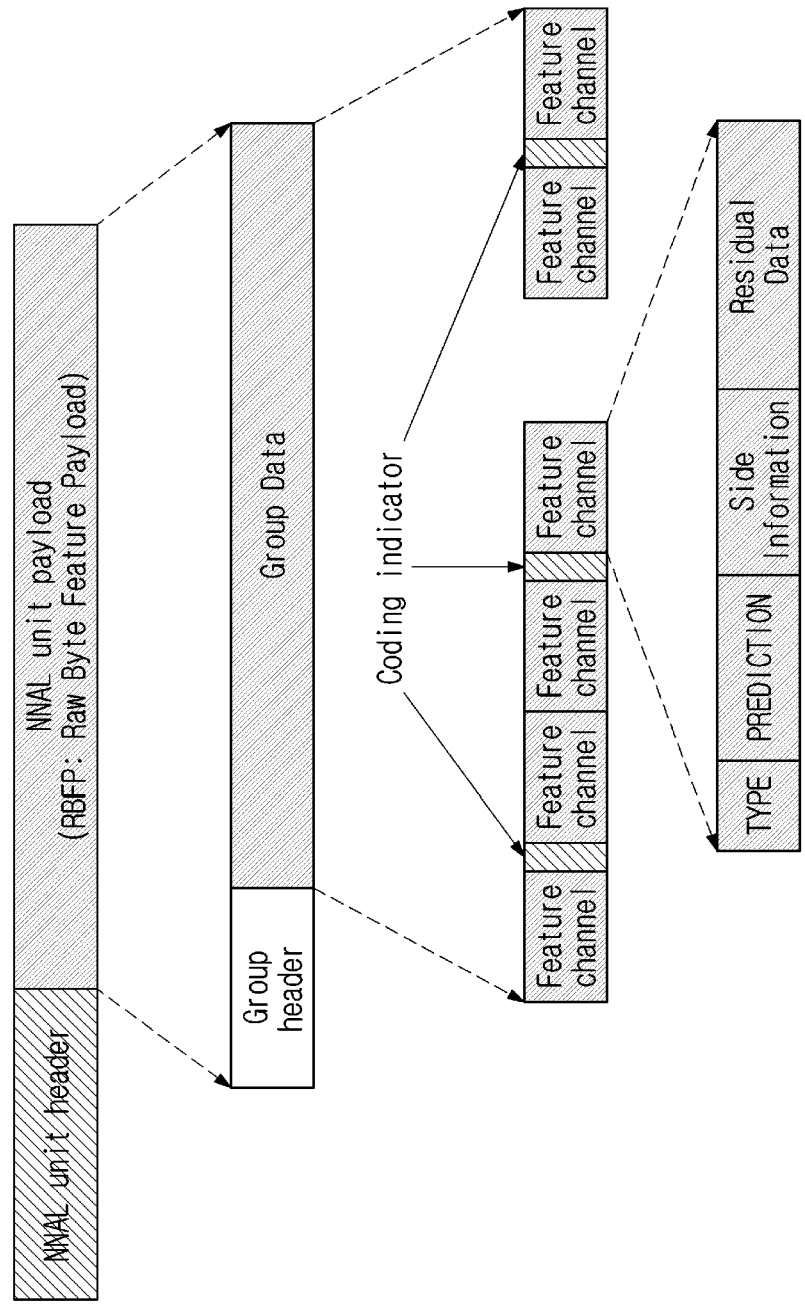
FIG. 25 is a diagram illustrating an example of a bitstream composed of an encoded abstracted feature and NNAL information.

FIG. 25 is a diagram illustrating an example of a bitstream composed of an encoded abstracted feature and NNAL information. A bitstream configured as shown in FIG. 25 may be referred to as an NNAL unit. The NNAL unit means an independent feature reconstruction unit, and an input feature that is a compression target of one NNAL unit shall have the same characteristics. For example, the same feature extraction method may be applied to input features for one NNAL unit. For example, input features for one NNAL unit may be extracted from the same layer using the same neural network. As shown in FIG. 25, the NNAL unit may be composed of an NNAL unit header and an NNAL unit payload. Examples of each property of the unit may be defined as shown in the table below. The following definitions are examples, and the types and definitions of each property of the NNAL unit are not limited by the table below.

TABLE 5

| NNAL unit item | Description |
| --- | --- |
| NNAL unit header | All information necessary to use the encoded feature according to the task (e.g., NNAL information of Table 4) |

TABLE 5-continued

| NNAL unit item | Description |
| --- | --- |
| NNAL unit payload | Information on the encoded abstracted feature |
| Group header | Information on the composition of group data (e.g., temporal order, size of the configured feature channel, common properties of feature channels) |
| Group data | Set of feature channels |
| Feature channel | Encoded feature unit |
| Type | Method used for encoding |
| Prediction | Detailed mode of method used for encoding |
| Side information | Additional information necessary for decoding (e.g., entropy coding, quantization, data, reference information, etc.) |
| Residual data | Set of encoded feature value information |

Figure 26:
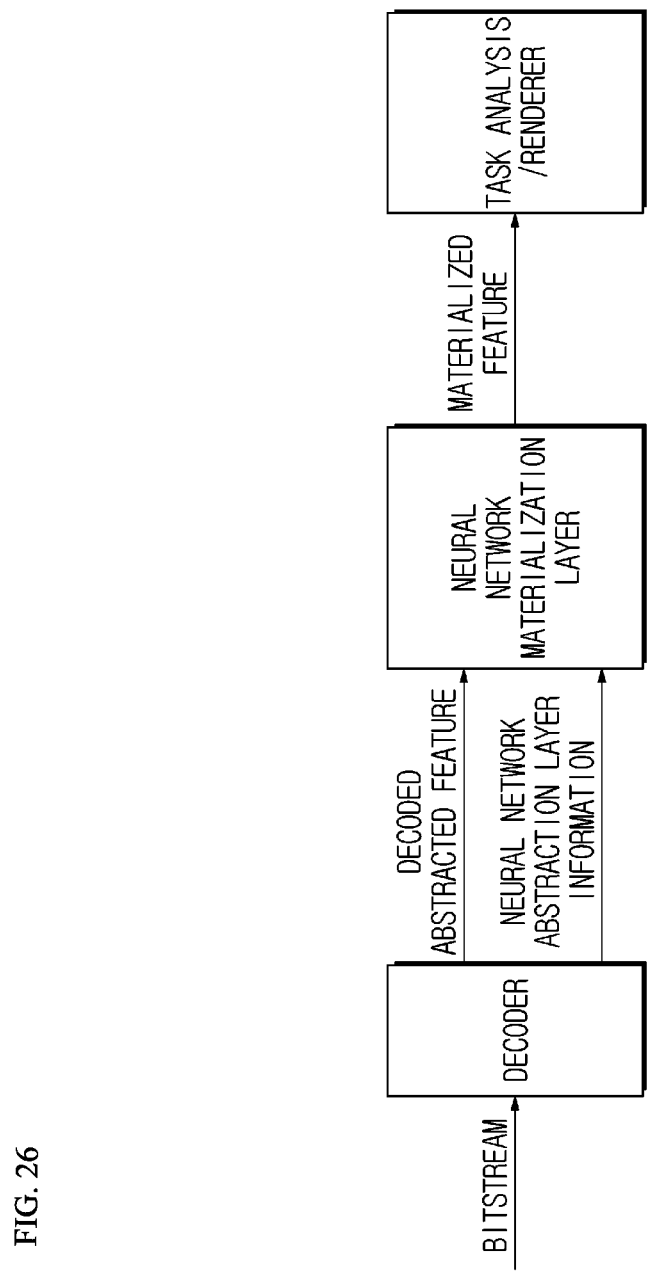
FIG. 26 is a diagram illustrating an example of a decoding process.
Figure 27:
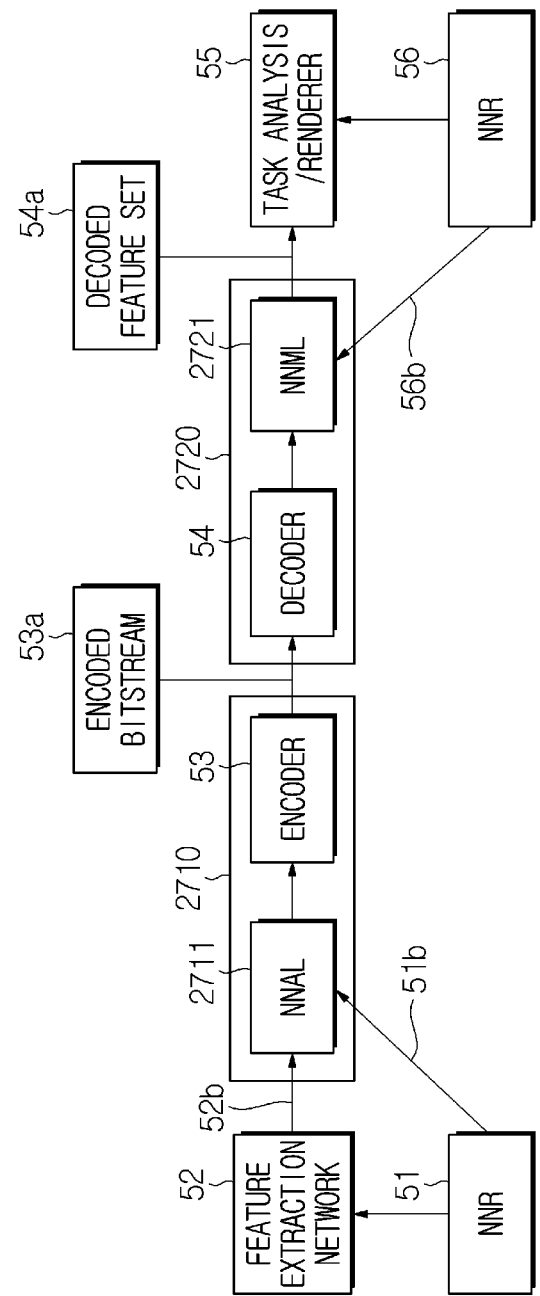
FIG. 27 is a diagram illustrating an example of a VCM structure to which neural network abstraction and materialization proposed in the present disclosure are applied.

FIG. 26 is a diagram illustrating an example of a decoding process. The bitstream may be decoded by the decoder into a decoded abstraction feature and neural network abstraction layer information (NNAL information). A Neural Network Materialization Layer (NNML) may use NNAL information to materialize the decoded abstracted feature again according to a feature extraction network, thereby composing and outputting a materialized feature. A task analysis/renderer may perform a task suitable for the purpose by using the materialized feature. FIG. 27 is a diagram illustrating an example of a VCM structure to which neural network abstraction and materialization proposed in the present disclosure are applied. FIG. 27 illustrates improvements based on the VCM structure described in FIG. 22. In FIG. 27, the description described in FIG. 22 may be applied to a configuration using the same reference numerals as in FIG. 22 without change. In FIG. 27, an encoding apparatus 2710 may include an NNAL 2711 and an encoder 53. The decoding apparatus 2720 may include a decoder 54 and an NNML 2721.

In the case of abstracting an input feature using a neural network in the NNAL 2711 and changing a neural network used in the NNAL 2711, the NNAL 2711 may use an interface 51b between the NNAL 2711 and an NNR 51 in order to obtain necessary information from the NNR 51. Meanwhile, the necessary information may be obtained using an interface 52b between the feature extraction network 52 and the NNAL 2711.

Similarly, in the case of materializing the decoded abstracted feature using a neural network in the NNML 2721 and changing the neural network used in the NNML 2721, the NNML 2711 may use an interface 56*b* between the NNML 2721 and the NNR 56 in order to obtain the necessary information from the NNR 56.

The interfaces 51*b* and/or 56*b* may be used as information passages for providing information and methods necessary for abstraction and materialization in addition to the neural network.

Figure 28:
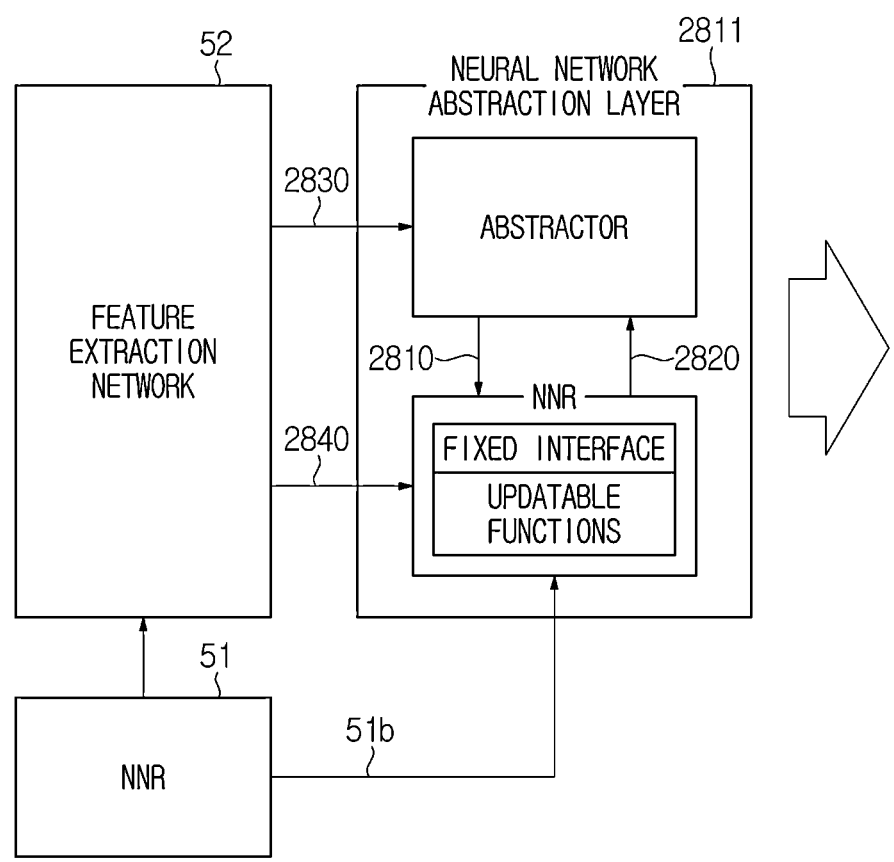
FIG. 28 is a diagram illustrating an example of operation of an interface between an NNAL and an NNR.

FIG. 28 is a diagram illustrating an example of operation of the interface 51*b* between the NNAL 2711 and the NNR 51. In the embodiment of FIG. 28, in the NNR 51, not only the neural network is replaced, but also all information required for abstraction may be replaced. The replacement function of the neural network may include replacement of information for abstraction and/or feature extraction, and may include replacement of other information. For example, the NNR 51 may change the network used in the feature extraction network 52. In addition, when the network used in the feature extraction network 52 is changed, the property of the feature extracted from the feature extraction network 52 is changed. To cope with this case, the method of abstracting the extracted feature may be changed. As shown in FIG. 28, in order to update the abstraction method according to operation of the abstractor in the NNAL 2811, information necessary for abstraction may be transmitted to the NNAL 2811 through the NNR interface 51*b*. The NNAL 2811 may use this information to update functions required for abstraction.

For example, the NNR in the NNAL 2811 may update the abstraction function using information required for the abstraction received from the NNR 51 through the NNR interface 51*b*. Updatable functions indicate examples in which abstracted functions are updated using the NNR interface 51*b*. In FIG. 28, a fixed interface means that interface of updatable functions is fixed. For example, even if a function required for abstraction is changed through the NNR interface 51*b* of FIG. 28, the interface inside the NNAL may not be changed.

The abstractor in the NNAL may perform a function of abstracting a feature set 2830 received from the feature extraction network. Interfaces 2810 and 2820 between the abstractor in the NNAL and the NNR in the NNAL may be used in order to use the information and functions of the NNR required for the abstraction in the NNAL. By using the interfaces 2810 and 2820 between the abstractor in the NNAL and the NNR in the NNAL, the abstractor in the NNAL may access the functions and information of the NNR in the NNAL. Furthermore, by using the interfaces 2810 and 2820 between the abstractor in the NNAL and the NNR in the NNAL, the abstractor in the NNAL may transmit the feature set received from the feature extraction network and information on it to the NNR in the NNAL.

In this case, the NNR in the NNAL may apply a function required for abstraction to a feature set and then return it to the abstractor. The table below shows examples of the interfaces 2810 and 2820 between the abstractor in the NNAL and the NNR in the NNAL. The examples of the interfaces described in the table below is only one embodiment, and the interfaces 2810 and 2820 between the abstractor in the NNAL and the NNR in the NNAL may be used in other forms.

TABLE 6

| Item | Description |
| --- | --- |
| Feature properties | Feature properties shown in Table 2 |
| Feature set | Feature which is an abstraction target |
| Function list | Information for use of function of NNR (e.g., function pointer) |

The table above shows an embodiment of information that may be signaled through the interface 51*b* between the NNAL and the NNR and properties thereof. The information may be signaled via the interface 2840 between the feature extraction network 52 and the NNR in the NNAL.

TABLE 7

| Item | Description |
| --- | --- |
| Feature properties | Feature properties shown in Table 2, changed feature properties in Table 3, NNAL information, information required to configure NNAL information, etc. |
| Feature set | Abstracted feature set, or changed feature set for abstraction |
| Function list | Information for use function of NNR (e.g., function pointer) |

Figure 29:
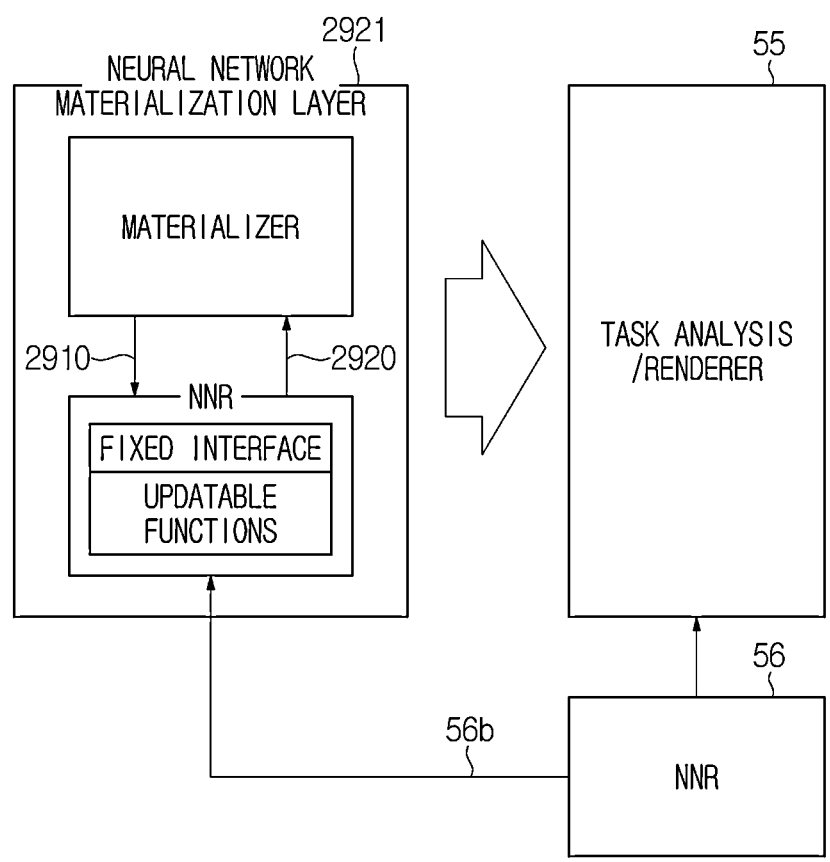
FIG. 29 is a diagram showing an example of an interface between an NNML and an NNR.

The table above shows an embodiment of information that may be signaled through the interfaces 2810 and 2820 between the abstractor in the NNAL and the NNR in the NNAL and properties thereof. FIG. 29 is a diagram illustrating an example of the interface 56*b* between the NNML 2721 and the NNR 56. In FIG. 29, the NNR 56 may perform not only replacement of the neural network but also replacement of all information required for materialization of a feature. The replacement function of the neural network is only one example of the replacement and provision of information for materialization of a feature. The NNR 56 may transmit information required for materialization to the NNML 2921 through the NNR interface 56*b*. The NNML 2921 may use this information to update the functions required for materialization. The updatable functions shown in FIG. 29 indicate that functions required for materialization in a materializer are updatable via the NNR interface 56*b*.

The fixed interface of FIG. 29 indicates that the interface of updateable functions is fixed. For example, even if a function required for materialization is changed through the NNR interface 56*b*, the interface inside the NNML 2921 may not be changed.

The materializer of the NNML 2921 may perform a function of materializing the decoded abstracted feature set. Interfaces 2910 and 2920 between the materializer in the NNML and the NNR 56 in the NNML may be used to obtain, from the NNR in the NNML, the NNR information and/or related functions required for materialization by the materializer in the NNML. For example, the materializer may access the functions and information of the NNR through the interfaces 2910 and 2920 between the materializer and the NNR, or transmit the abstracted feature set received from the decoder and information on it to the NNR in the NNML. In this case, the NNR in NNML may apply the function required for materialization to the abstracted feature set and then return it to the materializer. The table below shows an example of interfaces 2910 and 2920 between the materializer in NNML and the NNR in NNML, which may include all information required for materialization and decoding. Table 8 below shows an example of the interface 56*b* between the materializer in the NNML and the NNR 56*b*. In addition, Table 9 below shows an example of interfaces 2910 and 2920 between the materializer in the NNML and the NNR in the NNML.

TABLE 8

| Item | Information |
| --- | --- |
| Feature properties | Feature properties shown in Table 2, changed feature properties of Table 3, NNAL information, information required to configure NNAL information |
| Feature set | Abstracted feature set |
| Function list | Information for use function of NNR (e.g., function pointer) |

TABLE 9

| Item | Information |
| --- | --- |
| Feature properties | Feature properties and changed feature properties shown in Table 2 |
| Feature set | Materialized feature set and feature set changed for materialization |
| Function list | Information for use function of NNR (e.g., function pointer) |

Embodiment 2

Figure 30:
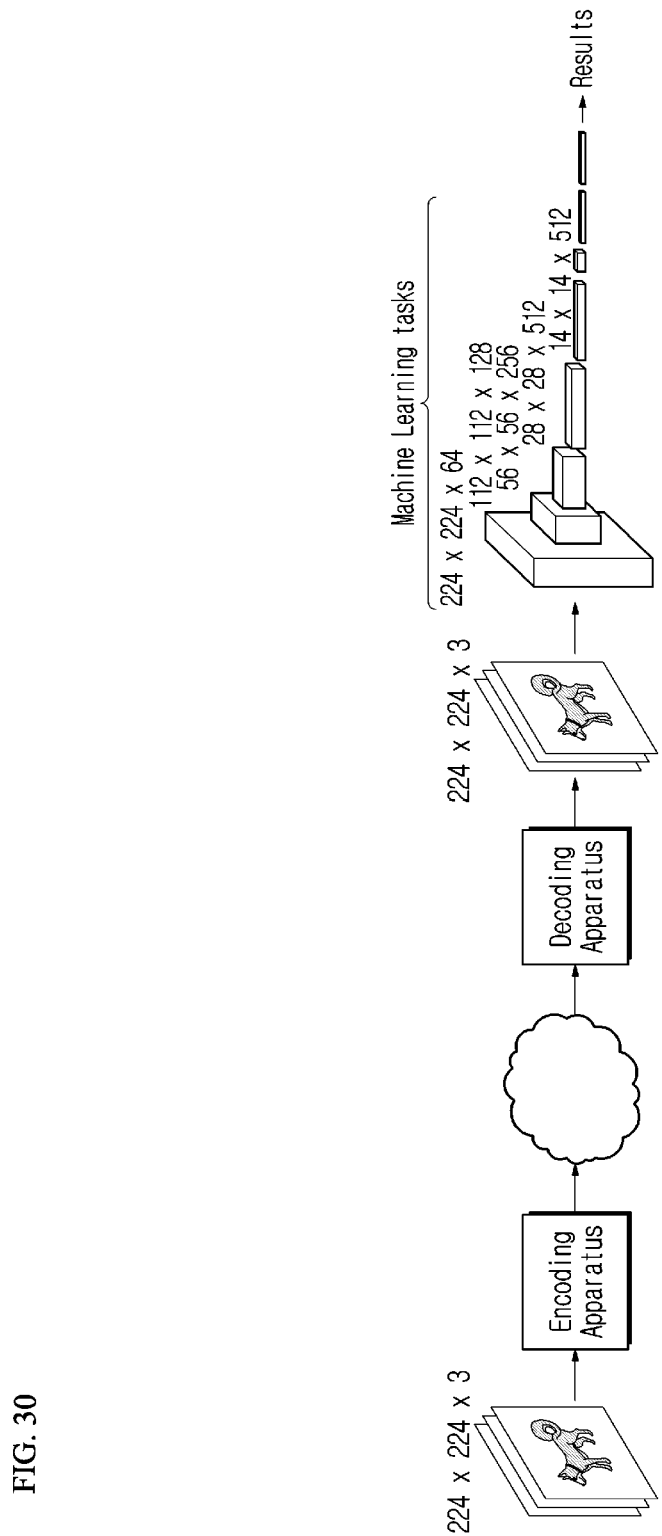
FIGS. 30 to 31 are diagrams illustrating a VCM system for performing feature encoding.

The present embodiment discloses a method of effectively performing feature encoding in VCM. FIG. 30 illustrates a method of transmitting an image obtained from a terminal to a server to perform a machine learning operation requiring high complexity in a method currently used in a number of artificial intelligence application fields. In this case, existing image and video compression methods such as JPEG, H.264, and HEVC may be used. However, existing image and video coding technologies may be inefficient in this artificial intelligence field. Existing image and video coding technologies were developed with a focus on human viewing, whereas most artificial intelligence applications are performed automatically through image analysis by machines without human intervention. In this regard, information coded with existing image and video coding technologies may contain information not required for machine learning.

Figure 31:
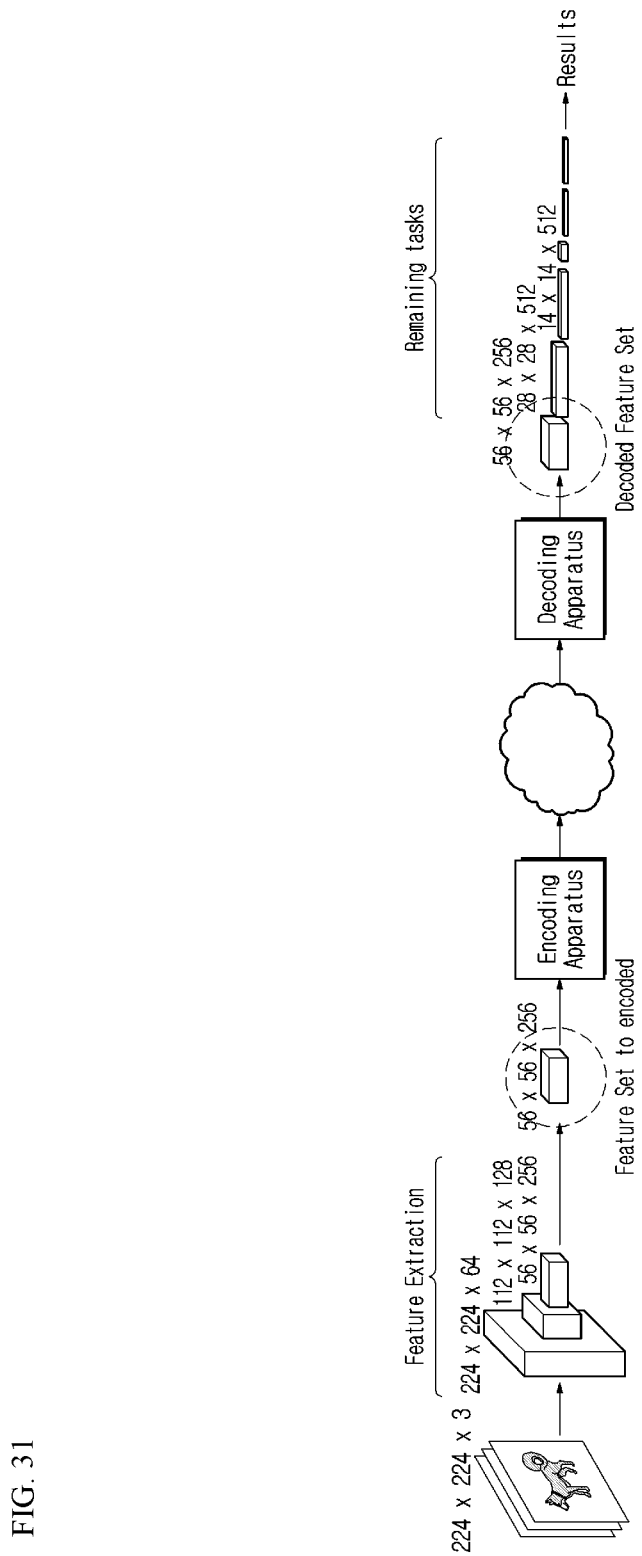

FIG. 31 is a view illustrating FIG. 30 in another way. FIG. 31 shows an embodiment of partially performing a machine learning operation performed in a server in a terminal to extract a feature that is feature information and encoding it. Since this method encodes and transmits only information necessary for machine learning, it may be more efficient in terms of encoding compared to FIG. 30.

However, the method shown in FIG. 31 also has a room for improvement. This is because, depending on the type of task in machine learning, unnecessary information may be encoded. If the type of task for machine learning is determined, by allowing a larger amount of information (e.g., allowing more bits) for important information and not transmitting relatively less important information or reducing the amount of information (e.g., allowing fewer bits) in performing the task, data compression rate can be maximized.

For example, when it is necessary to perform a specific machine learning task in the reception device 40 of FIG. 20, by allocating more bits to information more important to the task and allocating less bits to relatively less important information, it is possible to consider a method of efficiently compressing image information while maintaining the accuracy of the task in the receiver.

Hereinafter, when the task to be performed by the reception device 40 is object detection, a method of efficiently encoding a feature will be described in detail. The task (object detection) is just any one of various tasks to which the present embodiment may be applied, and the task to which the embodiments described below may be applied is not limited to object detection, and is applicable to all kinds of tasks for detecting a region of interest in an image.

The goal of object detection is to detect and recognize a region including objects in an image as shown in Examples 1 and 2 of FIG. 32. Therefore, the information in the boxed region is relatively more important than the information in other regions from the point of view of the machine learning task.

Figure 33:
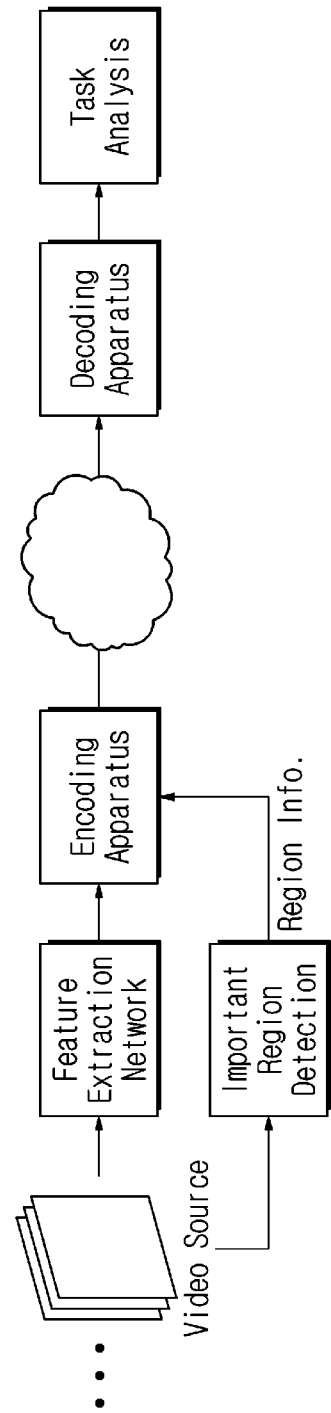
FIG. 33 is a diagram illustrating an embodiment of a video/image encoding apparatus and/or a video decoding apparatus to which an important region identification module is added.

FIG. 33 is a simplified schematic diagram of FIG. 20, and illustrates an example of a method of adding an important region detection module to FIG. 20 to detect an important region for a machine learning task and utilizing it for feature encoding. Important region detection may serve to detect a region including objects in an input image and provide information on the region. The region information may be used to efficiently encode a feature. The region information may be expressed in the following form.

pos_x: x position of the box
pos_y: y position of the box
width: width of the box
height: height of the box FIGS. 34 and 35 are diagrams illustrating two examples of expressing the region information. In FIG. 34, the upper-left point of a block is expressed by x-coordinate and y-coordinate, and the width of the block is expressed by width and the height of the block is expressed by height, whereas, in FIG. 35, the center point of a block is expressed by x-coordinate and y-coordinate and the width and height are expressed based on the center. Any method may be used, and blocks may be expressed in other ways than the above.

On the other hand, there is a need to transmit task information to be performed in order to apply encoding and decoding specialized for each machine learning task. FIG. 36 is a diagram illustrating an embodiment of syntax for signaling task information in order to perform the method proposed in the present disclosure. In the case of video, since it consists of a sequence of features, the following task information may be transmitted at a sequence level. In an embodiment, there may be more than one task to be performed by the reception device 40. Accordingly, the source device 30 may signal a syntax element task_id[i] indicating identifier information for each task according to the number indicated by num_tasks, after signaling a syntax element num_tasks indicating the total number of tasks.

In an embodiment, the syntax element task_id may have a value as shown in the table below, but is not limited to the items described in the table below.

TABLE 10

| Task Id | Task |
| --- | --- |
| 0 | Object detection |
| 1 | Object tracking |
| 2 | Face recognition |
| 3 | Motion detection |
| 4 | Object classification |
| 5 | Image/video capturing |
| ... | ... |

Through the important region detection process of FIG. 33, information on regions important for object detection may be extracted from the image. However, since the resolution of the image and the resolution of the feature to be compressed are generally different, it is necessary to transform information extracted from the image according to the feature resolution. The following is an example of transforming region information extracted from an image according to the feature resolution. [Equation 1]

scaleX=FeatureWidth/ImageWidth
scaleY=FeatureHeight/FeatureHeight
FeatureRegionPosX=round(ImageRegionPosX*ScaleX)
FeatureRegionPosY=round(ImageRegionPosY*ScaleY)
FeatureRegionWidth=round
   (ImageRegionWidth*ScaleX)
FeatureRegionHeight=round
   (ImageRegionHeight*ScaleY)

Here, ImageWidth and ImageHeight represent the resolution of the image, and ImageRegionPosX, ImageRegionPosY, ImageRegionWidth, and ImageRegionHeight represent the x-coordinate, y-coordinate, width, and height of the regions detected from the image. FeatureRegionPosX, FeatureRegionPosY, FeatureRegionWidth, and FeatureRegionHeight represent the x-coordinate, y-coordinate, width, and height transformed according to the resolution of the feature. The round( ) function is a rounding function that adds 0.5 and then rounds off below the decimal point.

The information transformed according to the feature resolution may be used to efficiently encode the feature. For example, the information may be used in a quantization process. Feature data extracted through the feature extraction network of FIG. 20 may require a quantization process of transforming it into an integer form before being encoded into a real number (32-bit float) form. In this case, information loss occurs due to the quantization process. Information loss may be minimized by allocating a large number of bits to information corresponding to an important region, and a small number of bits may be allocated to other regions.

The following equation shows an embodiment of a process of performing quantization in an encoder. Here, $f$ are real number (32-bit float) type feature values, and $\max(f)$ and $\min(f)$ mean the maximum and minimum values of the feature set. n represents a bit of information quantized as an integer. Here, $\tilde{f}$ denotes a quantized integer type result value.

$$\tilde{f} = \text{round}\left(\frac{f - \min(f)}{\max(f) - \min(f)} \cdot (2^n - 1)\right)$$ [Equation 2]

In an embodiment, based on the region information transformed according to the resolution of the feature, n=8 for the feature values included in the region and n=4 for the other region, thereby maximizing encoding efficiency while minimizing loss of the important information.

The following equation shows an embodiment in which the decoder performs inverse quantization. Here, $\tilde{f}$ is a quantized integer type feature, and $\overset{v}{f}$ is a an dequantized real-number type result.

$$\overset{v}{f} = \left(\frac{\tilde{f} \cdot (\max(f) - \min(f))}{2^n - 1} + \min(f)\right)$$ [Equation 3]

In order to properly transform the integer type information reconstructed by the decoder into a real number, region information shall be transmitted. This is because a different n value shall be applied to the region and other regions during decoding.

The important region-based bit allocation technique proposed in the present embodiment may be applied to various levels. It may be applied in units of each feature, may be applied in units of feature sets, or may be transmitted at a higher level. Below is an example applied to the feature set level. In order to apply the corresponding technique at the feature set level, information on an important region shall be transmitted at the feature set level, and, as shown in FIG. 37, the information may be transmitted by being included in the feature set header. Since the region information is specific to a specific task, it shall be transmitted only when it corresponds to a specific task. Accordingly, the region information may be transmitted only when it corresponds to a specific task based on the information specified in FIG. 37.

FIG. 37 illustrates an example in which a task corresponds to object detection. Since there may be more than one important region included in the image, a syntax element num_regions indicating the total number of important regions in the image is transmitted first, and the x and y coordinates for each region and the width and height of the region are transmitted. In this way, region information may be transmitted only for necessary tasks.

In the present embodiment, an efficient encoding method by extracting region information important for a specific task and applying it to a feature quantization process is shown. However, the present disclosure is not limited to being applied only to feature quantization and may be utilized in any process for encoding a feature.

Embodiment 3

Figure 38:
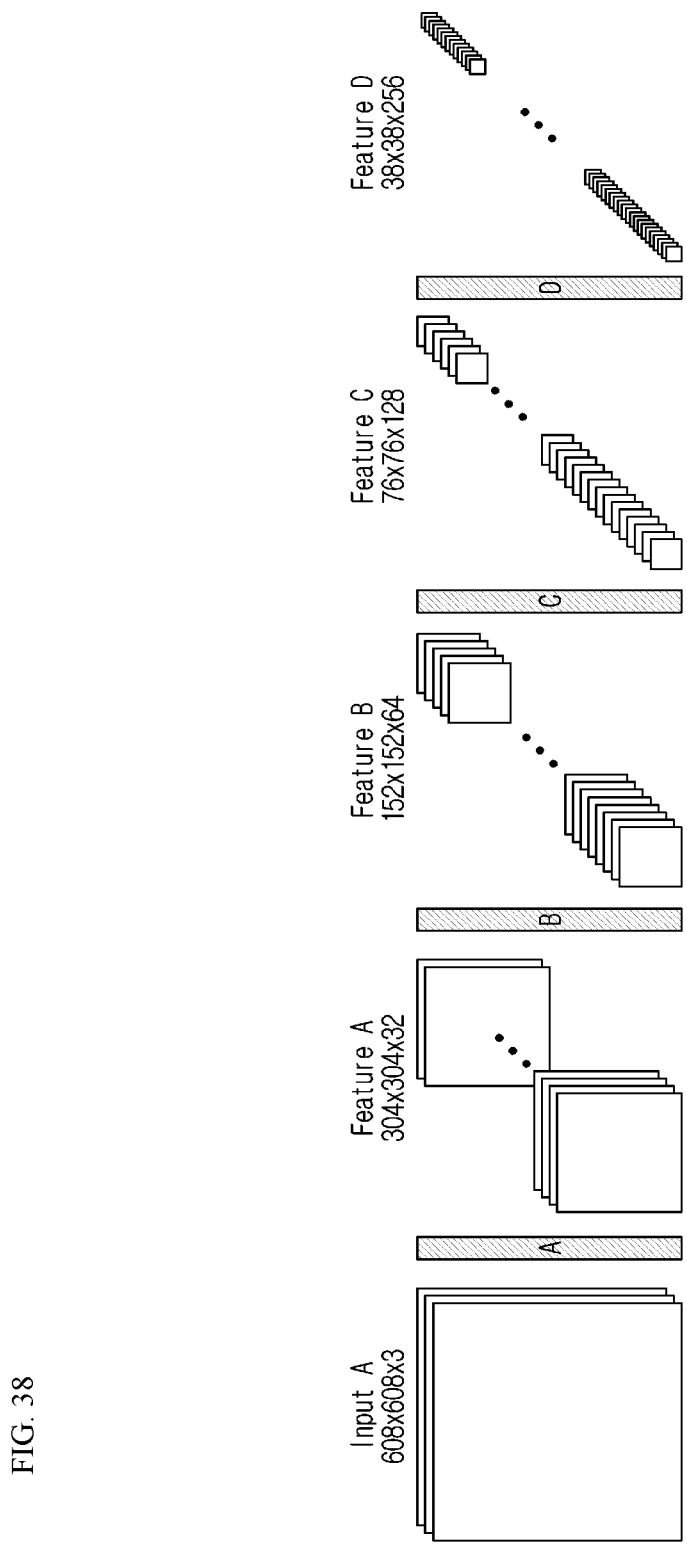
FIG. 38 is a diagram illustrating an embodiment of output data for each layer for an RGB input image.

Hereinafter, an embodiment in which a feature map generated in a hidden layer of a deep neural network is more efficiently expressed will be described. Input data input to the neural network may pass through several hidden layers. In addition, the calculation result of each hidden layer may have different sizes depending on the type of neural network being used and the depth of the hidden layer. FIG. 38 illustrates an embodiment of output data for each layer for an RGB input image. FIG. 38 illustrates the size of output data for each layer that changes as the depth of the neural network according to an embodiment increases.

Shaded A, B, C, and D of FIG. 38 may be one of the hidden layers of a neural network such as convolution and pooling, or may be a bundle of several hidden layers of a neural network. FIG. 38 illustrates an example in which, as an input image composed of three channels passes through each layer or successive layers, a spatial size may be reduced and the number of channels is gradually increased. The following notation may be used to represent data shown in FIG. 38.

Figure 39:
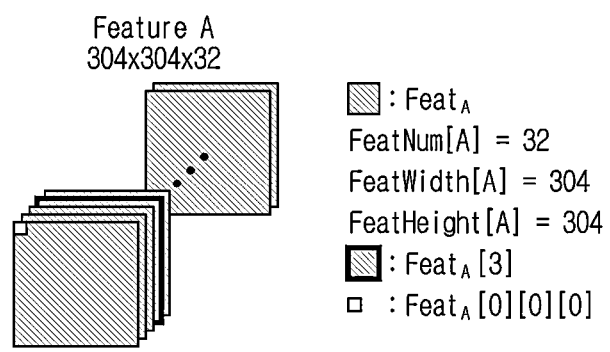
FIG. 39 is a diagram illustrating an example of feature notation.

All features of Layer N: $Feat_N$
Number of feature channels of Layer N: FeatNum[N]
Feature width of Layer N: FeatWidth[N]
Feature height of Layer N: FeatHeight[N]
C-th channel feature of Layer N: $Feat_N[C]$
C-th channel feature (x, y) coordinate value of Layer N: $Feat_N[C][x][y]$ According to the above notation, feature A of FIG. 38 may be expressed as shown in FIG. 39. As in the example of FIG. 39, the notation may be used to express all features for each layer in the neural network and channels of features and/or one feature value for each channel.

Figure 40:
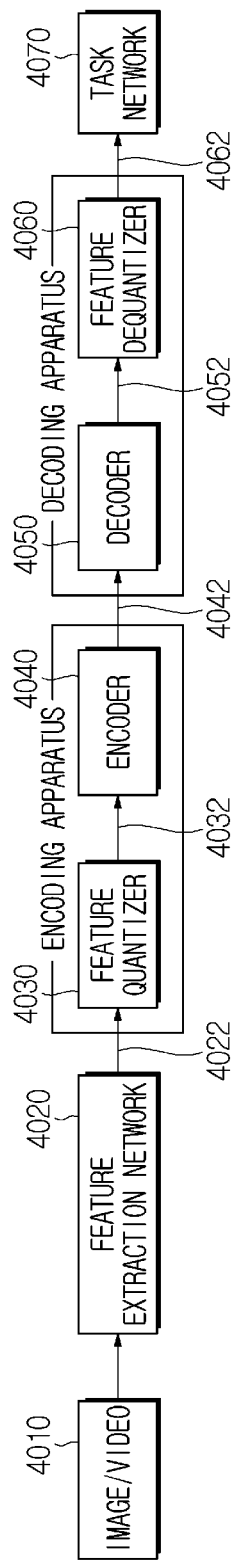
FIG. 40 is a diagram illustrating a VCM system including a feature encoding apparatus and a feature decoding apparatus according to an embodiment.

FIG. 40 is a diagram illustrating a VCM system in which a feature encoding apparatus and a feature decoding apparatus are configured according to an embodiment. The encoding apparatus of FIG. 40 may generate a bitstream by compressing data in order to extract a feature from an image and efficiently transmit it. The decoding apparatus may reconstruct the received bitstream into a feature and transmit it to a network performing a task. The output 4022 of the feature extraction network 4020 may be data in the form of a floating point number. A feature quantizer 4030 of the encoding apparatus may transform the input in the form of the floating point number into an integer type of a predetermined number of bits and output it (4032). An encoder 4040 may encode feature data and output it in the form of a bitstream (4042). A decoder 4050 may receive a bitstream as an input and output decoded data 4052. Since the output value 4052 of the decoder 4050 is quantized data in the encoding apparatus (e.g. quantized by the feature quantizer), the output value 4062 obtained by performing the dequantization operation by the feature dequantizer 4060 may be transmitted to a task network 4070. The task network 4070 may use the reconstructed feature to obtain a final output value through a network suitable for each task.

Hereinafter, various methods for transforming the form of a feature into a form that is easily compressed are disclosed. A transform process may be applied to the result 4022 of the feature extraction network 4020 or the result 4032 of the feature quantizer 4030 and an inverse transform process may be applied to the result 4052 of the decoder 4050 or the result 4062 of the feature dequantizer 4060 to reconstruct an original form. A feature transformed into various forms may be defined as a coding format (CF).

In the following description, a process of transforming a feature into a CF and a process of inversely transforming a CF into a feature will be described. The VCM system may employ and use an embodiment that exhibits optimal efficiency according to a compression algorithm among the embodiments according to the following description.

Embodiment 3-1

Figure 41:
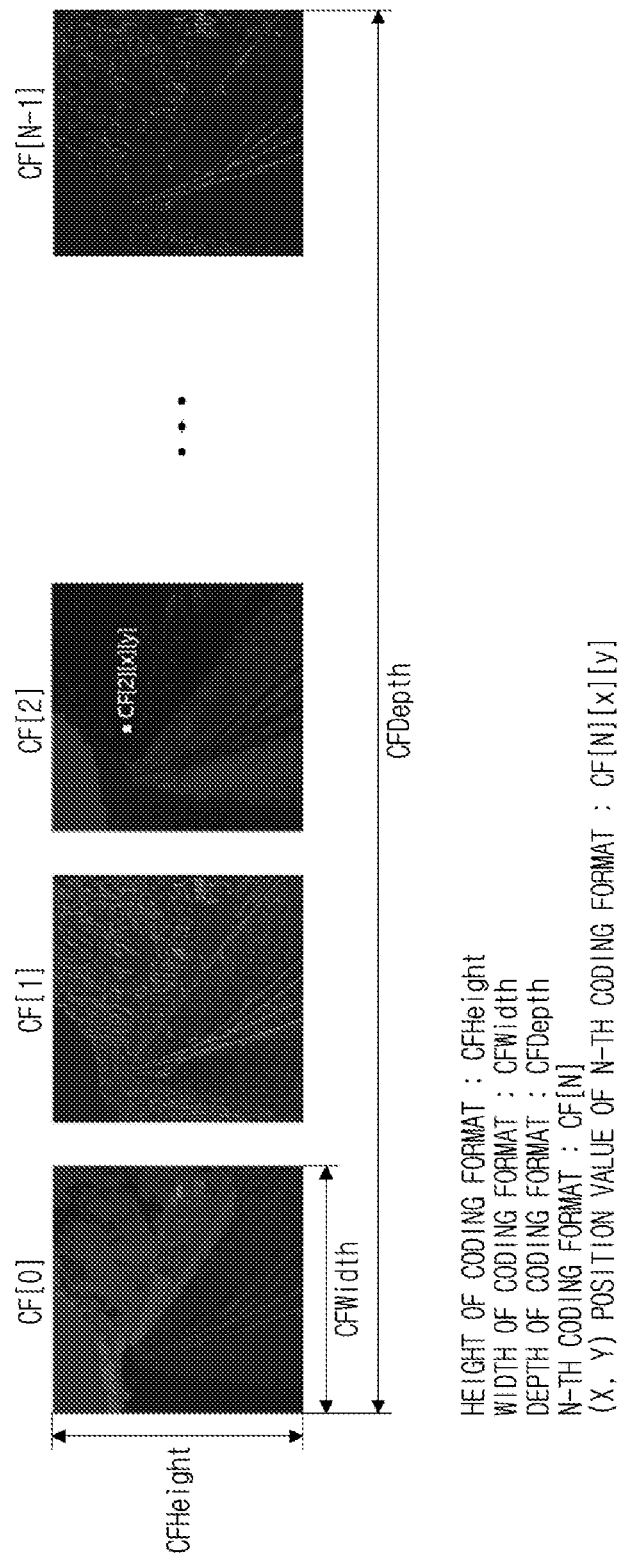
FIG. 41 is a diagram illustrating main parameters of a CF according to an embodiment.

In an embodiment, in order to transform a feature into a CF or inversely transform a CF into a feature, each channel FeatN[C] of Feat$_N$, which is an output feature at layer N, may be a target of independent compression. FIG. 41 illustrates main parameters of a CF according to an embodiment. FIG. 42 illustrates a process of transform into a CF and inverse transform into a feature in the present embodiment.

In FIG. 42, FeatHeight*[ ], FeatWidth*[ ], FeatNum*[ ], and FeatL*[ ] represent parameters reconstructed through an inverse transform process. Since transform and inverse transform of a feature according to the present embodiment treats the channel of the feature as an independent coding unit, the size of the feature and number of channels are not changed, and may be reflected in the size of the CF and number of depths. Accordingly, as a result of transform according to the present embodiment, a CF having the same width, height, and depth as the feature may be generated as shown in FIG. 41.

Embodiment 3-2

In an embodiment, in order to transform a feature into a CF or inversely transform a CF into a feature, individual feature channels may be concatenated to each other without a form transform to generate a CF in the form of one large picture. FIG. 43 illustrates an embodiment of a CF according to the present embodiment. FIG. 44 illustrates an algorithm for transforming a feature into a CF or inversely transforming a CF to a feature according to the present embodiment.

In order to prepare for the case where the number of channels may not be divisible by an integer when features in each channel are successively concatenated by numbers Numc and Numr in horizontal and vertical directions, after determining the number Numc of features to enter the horizontal region of the CF, the value obtained by dividing the number of all features by Numc is input to a ceiling function (Ceiling function, Ceil(x)) and used as the Numr value so that the Numr value becomes an integer.

Figure 45:
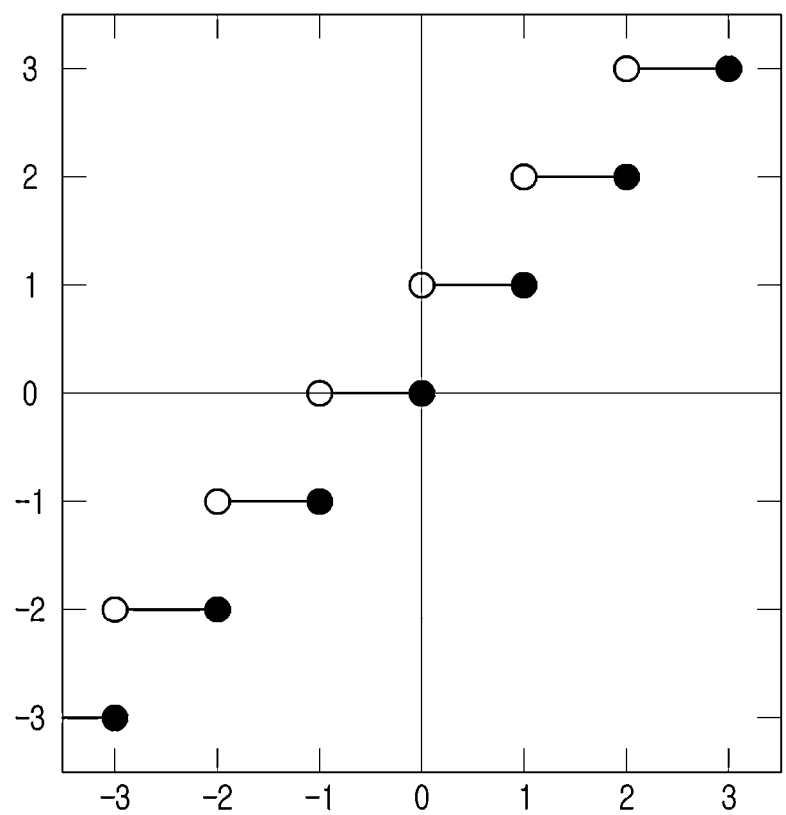
FIG. 45 is a diagram illustrating the definition of a ceiling function and a graph of the ceiling function according to an embodiment.

Here, the value of NumC may be arbitrarily determined. In an embodiment, the value of NumC may be determined as a value obtained by dividing the width of the image by the width FeatWidth[ ] of the feature. In addition, for the purpose of correcting a difference between the number of real features and the number of features included in the CF, a variable DiffNum representing the difference between the number of real features and the number of features included in the CF may be used, and the value thereof may be determined as shown in FIG. 44. The following equation and FIG. 45 illustrate the definition of the ceiling function used in the present embodiment and a graph of the ceiling function.

$$\text{Ceil}(x) = \min\{n \in Z | n \geq x\}, Z \text{ is the set of integers} \quad \text{[Equation 4]}$$

Embodiment 3-3

In an embodiment, in order to transform a feature into a CF or inversely transform a CF into a feature, a part of the entire activation map may be placed on a two-dimensional space and defined as a coding group (CG). In an embodiment, the CF depth CFDepth may be increased until all features may be expressed using CGs of the same size. If the number of feature channels included in one CG is c, and, when FeatNum[L] cannot be divided by c, CGs corresponding in number to a quotient may be generated to fill the features and another CG may be further generated to fill features corresponding in number to the remainder and then the remaining region may be filled with 0.

Figure 46:
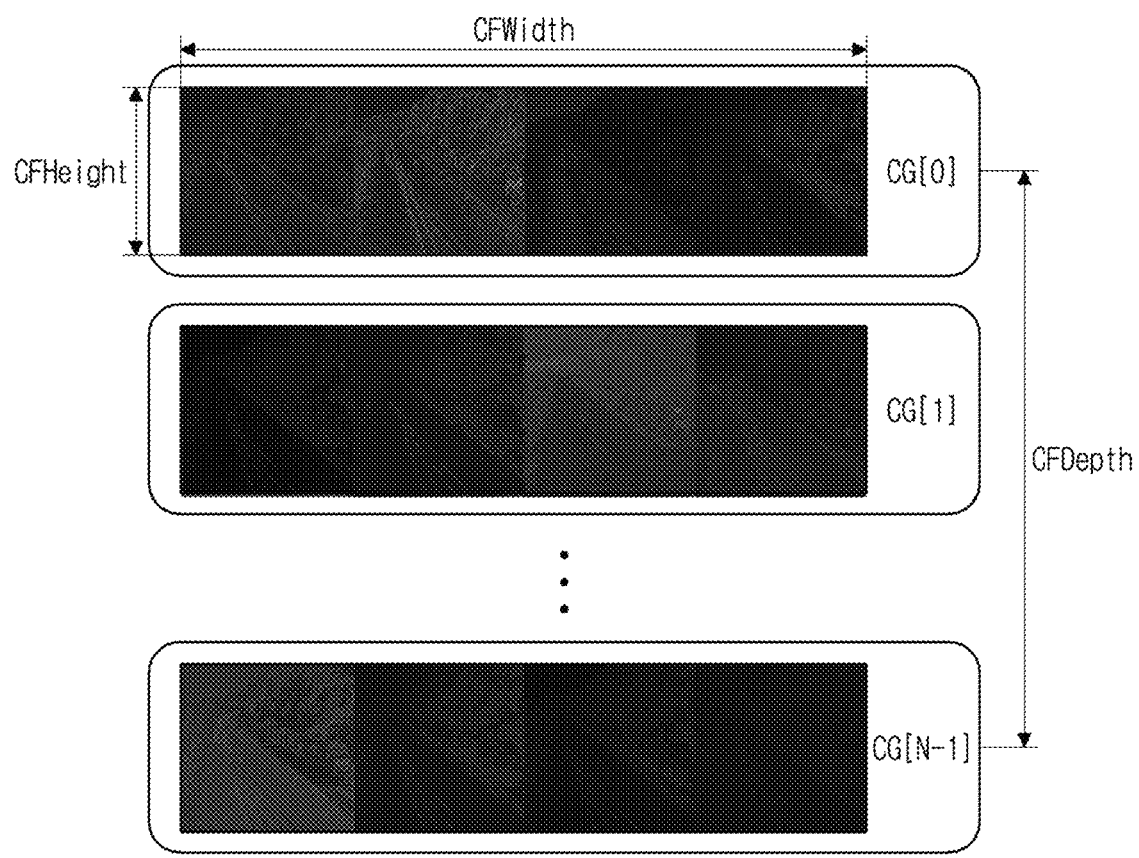
FIG. 46 is a diagram illustrating an embodiment of a CF generated according to an embodiment.

FIG. 46 illustrates an embodiment of a CF generated according to the present embodiment. FIG. 47 illustrates an algorithm for performing transform from a feature into a CF and inverse transform from a CF into a feature according to the present embodiment.

Embodiment 3-4

Figure 48:
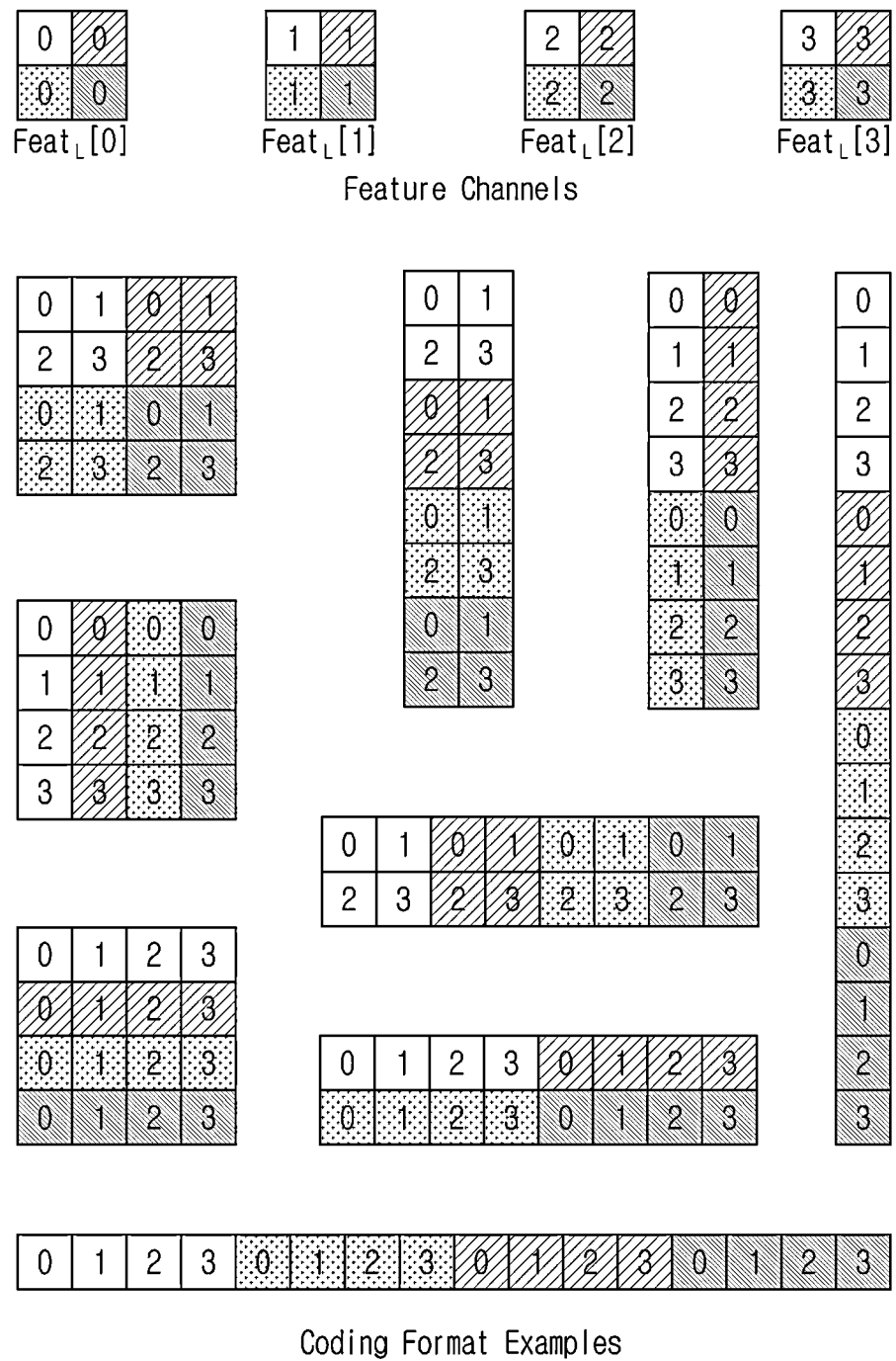
FIG. 48 is a diagram illustrating a CF generation method in an embodiment.
Figure 49:
FIG. 49 is a diagram illustrating an embodiment of a CF generated by bundling pixels into blocks in a 4×8 unit for a real feature having 32 channels having a 304×304 size and then arranging the blocks adjacent to each other.

In an embodiment, in order to transform a feature into a CF or inversely transform a CF into a feature, pixels on the same coordinates in each channel of the feature map are collected and bundled into blocks, and then the blocks are placed adjacent to a two-dimensional space, thereby generating one CF. FIG. 48 illustrates an example of a CF generation method in the present embodiment. FIG. 48 illustrates an example of a CF that may be generated when there are 4 2×2 size channels FeatL[0] to FeatL[3] in an arbitrary layer L. As can be seen in FIG. 48, pixel values at the same position in each channel are extracted, bundled into blocks having a square or rectangular shape, and then the blocks are arranged adjacent to each other to generate various types of CFs. A method of reconstructing an original feature channel form from the CF may be performed differently for each CF transform process. FIG. 49 illustrates an embodiment of a CF generated by bundling pixels into blocks in a 4×8 unit for a real feature having 32 channels having a 304×304 size and then arranging the blocks adjacent to each other.

Encoding and Decoding Method

Hereinafter, an image encoding method and a decoding method performed by an image encoding apparatus and an image decoding apparatus according to an embodiment will be described.

Figure 50:
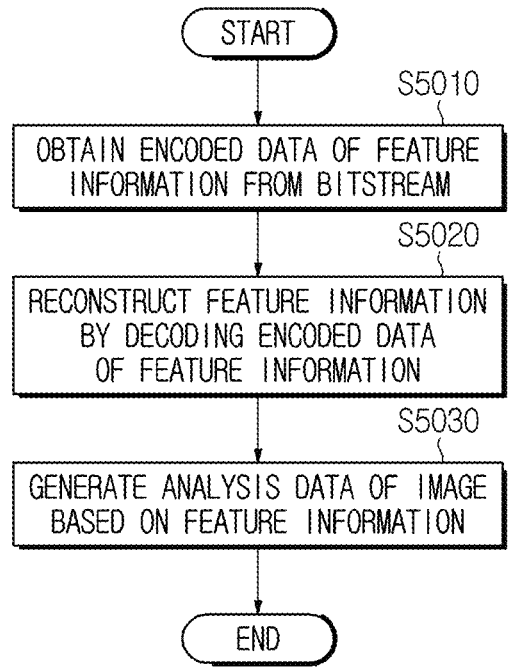
FIG. 50 is a diagram illustrating a method of decoding image-related feature information by a decoding apparatus in a VCM system according to an embodiment.

First, operation of the decoding apparatus will be described. An image decoding apparatus according to an embodiment includes a memory and a processor, and the decoding apparatus may perform decoding according to operation of the processor. FIG. 50 is a diagram illustrating a method of decoding image-related feature information by a decoding apparatus in a VCM system according to an embodiment. In the following description, a feature means a feature described above. The feature information refers to the above-described feature information. The abstracted feature information refers to the above-described abstracted feature information. The materialized feature information refers to the above-described materialized feature information.

The decoding apparatus according to the embodiment may obtain, from a bitstream, encoded data of the feature information generated by applying an artificial neural network-based feature extraction method to an image (S5010). Next, the decoding apparatus may reconstruct the feature information by decoding the encoded data of the feature information (S5020). Next, the decoding apparatus may generate analysis data of the image based on the feature information (S5030). Here, the decoding apparatus may reconstruct the feature information based on any one of abstraction information of the feature information, a region of interest of the feature information, and an encoding format for the feature information.

Figure 51:
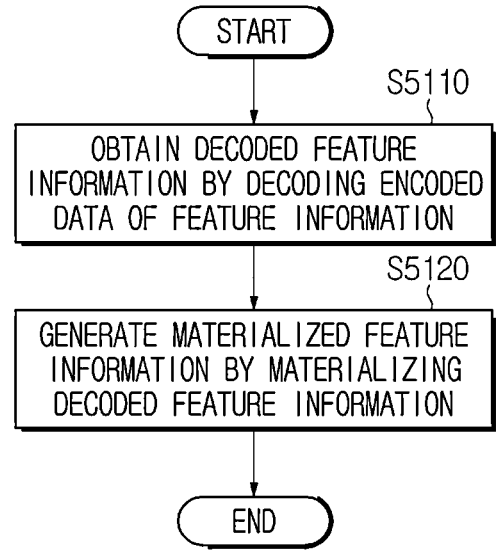
FIG. 51 is a flowchart illustrating a method of reconstructing feature information using abstraction information of feature information by a decoding apparatus according to an embodiment.

FIG. 51 is a flowchart illustrating a method of reconstructing feature information using abstraction information of feature information by a decoding apparatus according to an embodiment. The decoding apparatus according to an embodiment may obtain decoded feature information by decoding encoded data of the feature information (S5110). Next, the decoding apparatus may generate materialized feature information by materializing the decoded feature information (S5120). Here, the decoded feature information may be feature information abstracted based on the neural network abstraction information in the encoding process of the feature information. In addition, materialization of the feature information may be performed based on the decoded feature information and the neural network abstraction information. Here, the neural network abstraction information may be obtained from a bitstream.

In an embodiment, the encoded data of the feature information and the neural network abstraction information may be obtained from a bitstream in units of neural network abstraction units. In this case, the neural network abstraction information may be included in a header of the neural network abstraction unit (e.g., NNAL unit) as described above.

Figure 52:
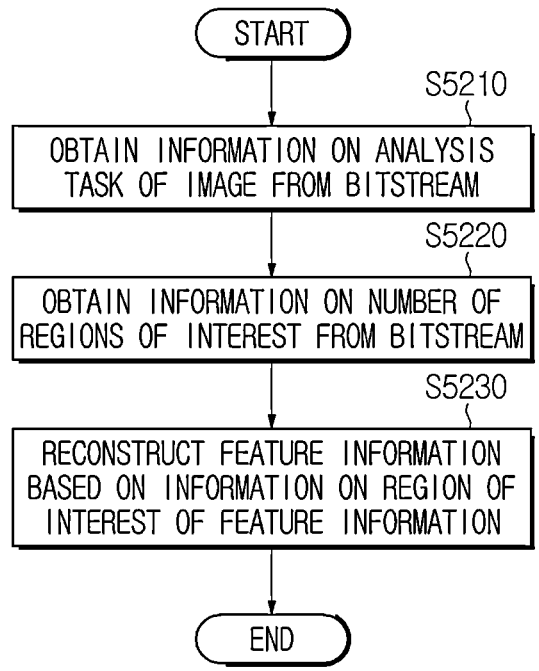
FIG. 52 is a flowchart illustrating a method of reconstructing feature information by using a region of interest of the feature information, by the decoding apparatus according to an embodiment.

FIG. 52 is a flowchart illustrating a method of reconstructing feature information by using a region of interest of the feature information by the decoding apparatus according to an embodiment. The decoding apparatus according to an embodiment may obtain information on an image analysis task from a bitstream (S5210). Next, the decoding apparatus may obtain information on the number of regions of interest from the bitstream (S5220). Next, the decoding apparatus may reconstruct the feature information based on the information on the region of interest of the feature information (S5230).

For example, as described above with reference to FIG. 36, information on an image analysis task (e.g., num_tasks, task_id[ ]) may be obtained from the bitstream, and information on the region of interest of the feature information may be obtained from the bitstream based on the information on the image analysis task.

In addition, as described above with reference to FIG. 37, information (e.g., num_regions) on the number of regions of interest in the image is obtained from the bitstream, and, based on the information (e.g., region_pos_x[ ], region_pos_y[ ], region_pos_width[ ], region_pos_height[ ], etc.) on the number of regions of interest in the image, information on the region of interest of the feature information may be obtained from the bitstream. Here, region_pos_x[ ], region_pos_y[ ], region_pos_width[ ] and region_pos_height[ ], which are information indicating the coordinates of the region of interest of the information on the region of interest of the feature information, may be determined based on the coordinates of the object identified in the image, the resolution of the image, and the resolution of the feature information extracted from the image.

Figure 53:
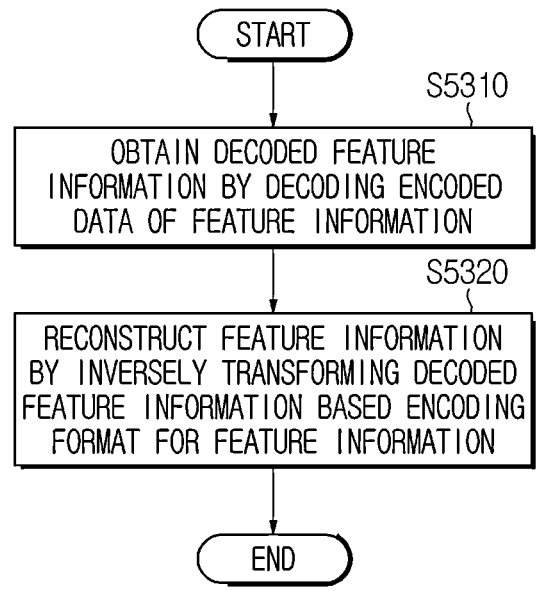
FIGS. 53 and 54 are flowcharts illustrating methods of performing encoding and decoding by a decoding apparatus and an encoding apparatus according to an embodiment.

FIG. 53 is a flowchart illustrating a method of reconstructing feature information using an encoding format of the feature information by a decoding apparatus according to an embodiment. The decoding apparatus according to an embodiment may obtain decoded feature information by decoding the encoded data of the feature information (S5310). Next, the decoding apparatus may reconstruct the feature information by inversely transforming the decoded feature information based on the encoding format for the feature information (5320). Here, the decoded feature information may be feature information transformed based on an encoding format for the feature information in the encoding process. Inverse transform of the feature information may be performed based on the decoded feature information and an encoding format for the feature information.

In an embodiment, as described above with reference to FIGS. 43 and 44, a plurality of feature information may be obtained by inversely transforming the decoded feature information based on an encoding format for the feature information. In this case, at least one piece of target feature information among a plurality of feature information may be identified based on coordinates and size information of the target feature information in the decoded feature information. For example, the decoded feature information may be composed of a set of a plurality of feature information. In addition, a plurality of feature information in the decoded feature information may be arranged in the form of a tile according to the tile scan order, and one target feature information may be identified by the top-left position of the target feature information and the width and height of the feature information. Alternatively, when a plurality of feature information in the decoded feature information all have the same width and height, the feature information may be identified by an index in the decoded feature information.

In another embodiment, as described above with reference to FIGS. 46 and 47, the decoded feature information may be inversely transformed based on an encoding format for the feature information to obtain a plurality of feature information. For example, at least one piece of target feature information among the plurality of feature information may be identified based on an index of a feature group to which the target feature information belongs in the decoded feature information and an index of feature information in the feature group.

Here, the index of the feature group to which the target feature information belongs in the decoded feature information may be an index indicating the CF depth described in FIGS. 46 and 47. In addition, the index of the feature information in the feature group may be information on a row and column that is an index indicating feature information in the CG of a specific CF depth.

For example, the index of the feature group to which the target feature information belongs in the feature information may be g in the example of CG[g] [iNumr+row] [jNumC+col] of FIG. 47. The index of the feature information in the feature group may be iNumr and jNumC in the example of CG[g] [iNumr+row] [jNumC+col] of FIG. 47.

In another embodiment, as described above with reference to FIGS. 48 and 49, based on collecting and grouping sub-information on the same coordinates in a plurality of feature information, a plurality of feature information may be identified from the decoded feature information. For example, a plurality of feature information may correspond to each channel of the feature map in the descriptions of FIGS. 48 and 49. In addition, sub-information on the same coordinates in the plurality of feature information may correspond to pixels on the same coordinates in each channel of the feature map in the descriptions of FIGS. 48 and 49. In addition, collecting and grouping sub-information on the same coordinates in a plurality of feature information may correspond to extracting a plurality of pixel values and bundling them into blocks in the description of FIGS. 48 and 49. In addition, the decoded feature information may correspond to a CF generated by arranging blocks adjacent to each other in the description of FIGS. 48 and 49.

Figure 54:
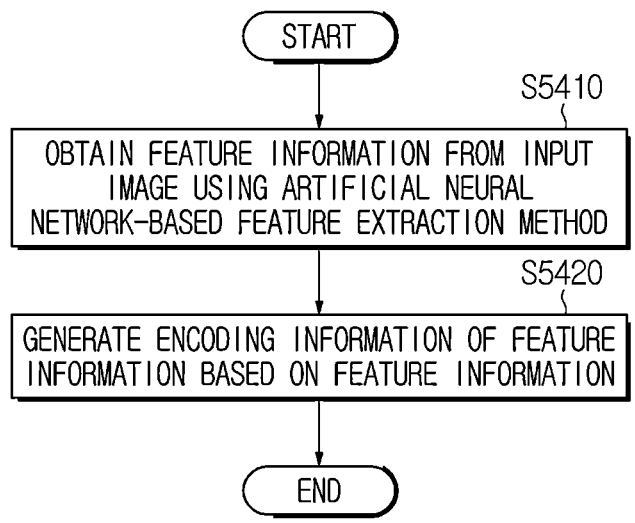

Next, operation of the encoding apparatus will be described. An image encoding apparatus according to an embodiment includes a memory and a processor, and the encoding apparatus may perform encoding in a manner corresponding to the decoding of the decoding apparatus by an operation of the processor. For example, as shown in FIG. 54, the encoding apparatus may obtain feature information from an input image using an artificial neural network-based feature extraction method (S5410). Next, the encoding apparatus may generate encoding information of the feature information based on the feature information (S5420). In correspondence with the above-described operation of the decoding apparatus, the encoding apparatus may generate encoding information based on any one of abstraction information of the feature information, a region of interest of the feature information, and an encoding format for the feature information.

For example, the encoding apparatus according to an embodiment may generate abstracted feature information by abstracting the feature information. In addition, the encoding apparatus may generate a bitstream by encoding the abstracted feature information. Here, the feature information may be abstracted based on the neural network abstraction information. In addition, neural network abstraction information may also be encoded and included in the bitstream.

In an embodiment, the encoded data of the abstracted feature information and the neural network abstraction information may be included in the bitstream in units of neural network abstraction units. In this case, the neural network abstraction information may be included in a header of the neural network abstraction unit as described above.

In addition, the encoding apparatus according to an embodiment may encode the feature information based on the region of interest. For example, the encoding apparatus may select a region of interest of the feature information, and may encode feature information corresponding to the region of interest by allocating more bits than feature information not corresponding to the region of interest. In addition, the encoding apparatus may signal information on the region of interest based on an analysis task and the number of regions of interest in the image. To this end, in encoding the information on the region of interest, the encoding apparatus may additionally encode information on an image analysis task, encode information on the number of regions of interest for each analysis task, and encode information on the region of interest and feature information thereof based on the number of regions of interest.

In addition, the encoding apparatus according to an embodiment may transform the feature information based on the encoding format and then encode the transformed feature information. Transform of the feature information may be performed based on an encoding format for the feature information. To this end, the encoding format of the feature information described with reference to FIGS. 43 to 49 and the encoding method may be applied to correspond to the decoding method described above.

Application Embodiments

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, in case it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a virtual reality (VR) device, an augmented reality (AR) device, a video telephony video device, a transportation terminal (e.g., a vehicle terminal including an autonomous vehicle, a robot terminal, an airplane terminal, a ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 55:
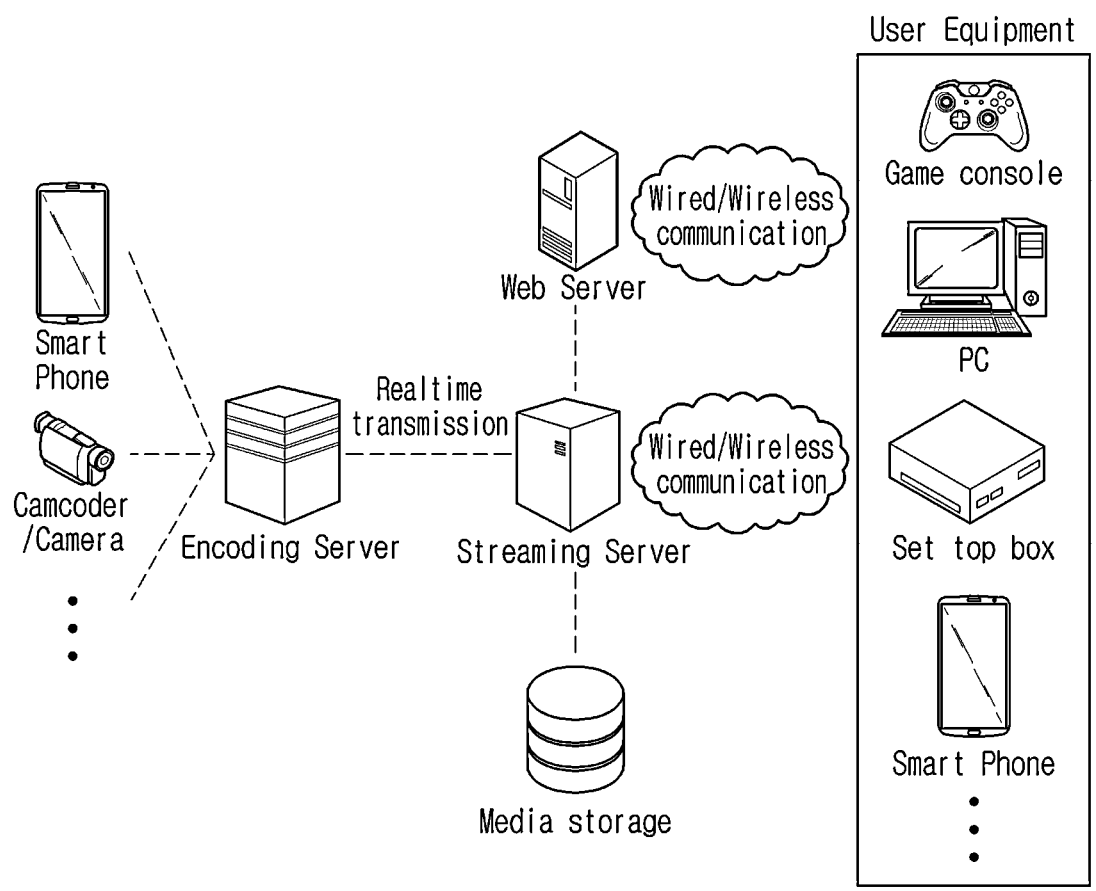
FIGS. 55 and 56 are diagrams illustrating a content streaming system to which an embodiment of the present disclosure is applicable.

FIG. 55 is a view showing a content streaming system, to which an embodiment of the present disclosure is applicable.

As shown in FIG. 55, the content streaming system, to which the embodiment of the present disclosure is applied, may largely include an encoding server, a streaming server, a web server (interconnected system), a storage server (media storage), a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

Figure 56:
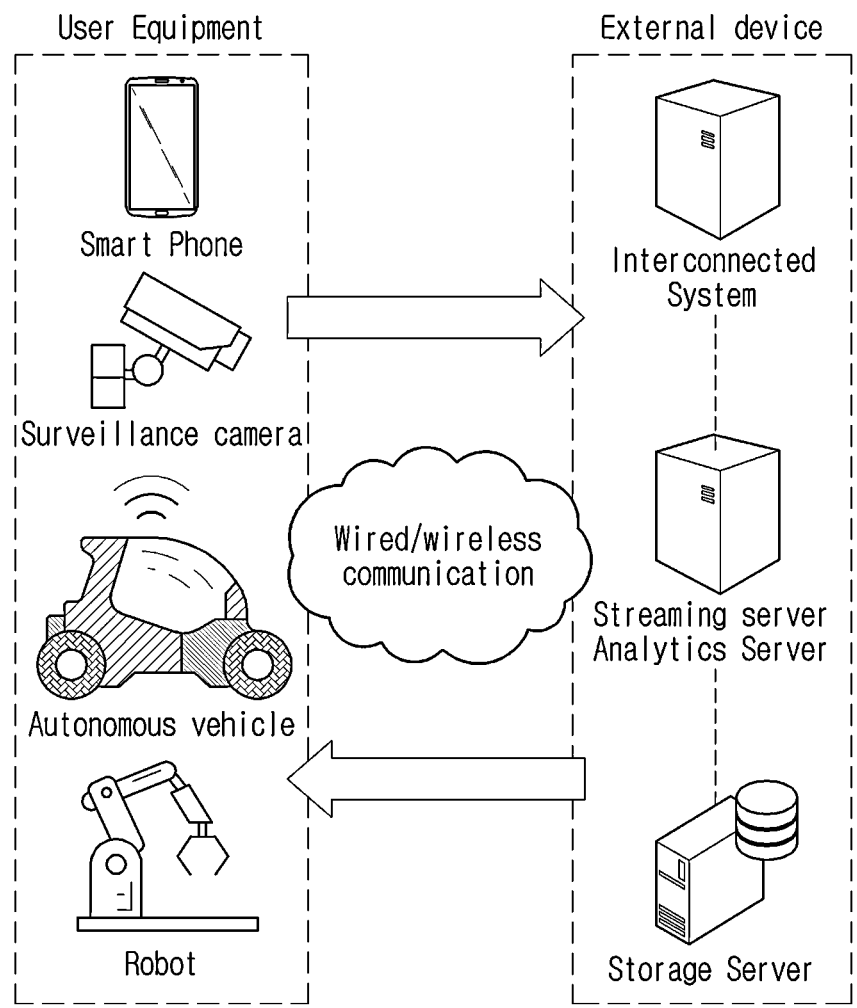

FIG. 56 is a diagram illustrating an embodiment of a content streaming system to which an embodiment of the present disclosure is applied. In an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system. The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method by an apparatus, comprising:
obtaining, from a bitstream, encoded data of feature information generated by applying an artificial neural network-based feature extraction method to an image;
reconstructing the feature information by decoding the encoded data of the feature information; and
generating analysis data of the image based on the feature information,
wherein the feature information is reconstructed based on any one of abstraction information of the feature information, a region of interest of the feature information and an encoding format for the feature information,
wherein the reconstructing the feature information comprises:
obtaining decoded feature information by decoding encoded data of the feature information; and
reconstructing the feature information by inversely transforming the decoded feature information based on an encoding format for the feature information,
wherein the decoded feature information is feature information transformed based on the encoding format for the feature information in an encoding process, and wherein inverse transform of the feature information is performed based on the decoded feature information and the encoding format for the feature information, wherein a plurality of feature information are obtained by inversely transforming the decoded feature information based on the encoding format for the feature information, and wherein at least one piece of target feature information of the plurality of feature information is identified based on an index of a feature group to which the target feature information belongs in the decoded feature information and an index of feature information in the feature group.

2. The image decoding method of claim 1, wherein the reconstructing the feature information comprises:

obtaining the decoded feature information by decoding the encoded data of the feature information; and generating materialized feature information by materializing the decoded feature information.

3. The image decoding method of claim 2, wherein the decoded feature information is feature information abstracted based on a neural network abstraction information in an encoding process, and wherein materializing of the feature information is performed based on the decoded feature information and the neural network abstraction information.

4. The image decoding method of claim 3, wherein the neural network abstraction information is obtained from the bitstream.

5. The image decoding method of claim 1, wherein the encoded data of the feature information and a neural network abstraction information are obtained from the bitstream in units of neural network abstraction units, and wherein the abstraction information of the feature information is included in a header of a neural network abstraction unit.

6. The image decoding method of claim 1, wherein information on an analysis task of the image is obtained from the bitstream, and wherein information on the region of interest of the feature information is obtained from the bitstream based the information on the analysis task of the image.

7. The image decoding method of claim 1, wherein information on a number of regions of interest of the image is obtained from the bitstream, and wherein the information on the region of interest of the feature information is obtained from the bitstream based on the information on the number of regions of interest of the image.

8. The image decoding method of claim 1, wherein the region of interest of the feature information is determined based on coordinates of an object identified from the image, resolution of the image and resolution of feature information extracted from the image.

9. The image decoding method of claim 1, wherein the plurality of feature information are obtained by inversely transforming the decoded feature information based on the encoding format for the feature information, and wherein the at least one piece of target feature information of the plurality of feature information is identified based on coordinates and size information of the target feature information in the decoded feature information.

10. The image decoding method of claim 1, wherein the feature information comprises a plurality of sub-information identified based on an index, and wherein the plurality of feature information are identified from the decoded feature information based on grouping the sub-information identified by a same index.

11. An image decoding apparatus comprising a memory and at least one processor, wherein the at least one processor is configured to:

obtain, from a bitstream, encoded data of feature information generated by applying an artificial neural network-based feature extraction method to an image;

reconstruct the feature information by decoding the encoded data of the feature information; and generate analysis data of the image based on the feature information, wherein the feature information is reconstructed based on any one of abstraction information of the feature information, a region of interest of the feature information and an encoding format for the feature information, wherein the reconstructing of the feature information comprises:

obtain decoded feature information by decoding encoded data of the feature information; and reconstruct the feature information by inversely transforming the decoded feature information based on an encoding format for the feature information, wherein the decoded feature information is feature information transformed based on the encoding format for the feature information in an encoding process, and wherein inverse transform of the feature information is performed based on the decoded feature information and the encoding format for the feature information, wherein a plurality of feature information are obtained by inversely transforming the decoded feature information based on the encoding format for the feature information, and wherein at least one piece of target feature information of the plurality of feature information is identified based on an index of a feature group to which the target feature information belongs in the decoded feature information and an index of feature information in the feature group.

12. An image encoding method by an apparatus, comprising:

obtaining feature information from an input image using an artificial neural network- based feature extraction method; and generating encoding information of the feature information based on the feature information, wherein the encoding information is generated based on any one of abstraction information of the feature information, a region of interest of the feature information and an encoding format for the feature information, wherein the generating the encoding information comprises:

obtaining transformed feature information by transforming the feature information based on an encoding format for the feature information; and generating encoded feature information by encoding the transformed feature information, wherein the encoded feature information is feature information transformed based on the encoding format for the feature information, wherein transform of the feature information is performed based on the feature information and the encoding format for the feature information, wherein a plurality of feature information are obtained by transforming the feature information based on the encoding format for the feature information, and wherein at least one piece of target feature information of the plurality of feature information is identified based on an index of a feature group to which the target feature information belongs in the feature information and an index of feature information in the feature group.

13. A non-transitory computer-readable recording medium storing a bitstream generated by an image encoding method, the image encoding method comprising:

obtaining feature information from an input image using an artificial neural network-based feature extraction method; and generating encoding information of the feature information based on the feature information, wherein the encoding information is generated based on any one of abstraction information of the feature information, a region of interest of the feature information and an encoding format for the feature information, wherein the generating the encoding information comprises:

obtaining transformed feature information by transforming the feature information based on an encoding format for the feature information; and generating encoded feature information by encoding the transformed feature information, wherein the encoded feature information is feature information transformed based on the encoding format for the feature information, wherein transform of the feature information is performed based on the feature information and the encoding format for the feature information, wherein a plurality of feature information are obtained by transforming the feature information based on the encoding format for the feature information, and wherein at least one piece of target feature information of the plurality of feature information is identified based on an index of a feature group to which the target feature information belongs in the feature information and an index of feature information in the feature group.

* * * * *